United States Patent
Wang et al.

(10) Patent No.: US 10,355,758 B2
(45) Date of Patent: Jul. 16, 2019

(54) MULTI-BAND ANTENNAS AND MIMO ANTENNA ARRAYS FOR ELECTRONIC DEVICE

(71) Applicants: Dong Wang, Waterloo (CA); Enliang Wang, Waterloo (CA)

(72) Inventors: Dong Wang, Waterloo (CA); Enliang Wang, Waterloo (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/726,842

(22) Filed: Oct. 6, 2017

(65) Prior Publication Data

US 2019/0109622 A1   Apr. 11, 2019

(51) Int. Cl.
| | |
|---|---|
| *H04B 7/0426* | (2017.01) |
| *H04B 7/0452* | (2017.01) |
| *H04B 7/0456* | (2017.01) |
| *H04B 7/0413* | (2017.01) |
| *H04W 88/02* | (2009.01) |

(52) U.S. Cl.
CPC ......... *H04B 7/0434* (2013.01); *H04B 7/0452* (2013.01); *H04B 7/0413* (2013.01); *H04B 7/0465* (2013.01); *H04W 88/02* (2013.01)

(58) Field of Classification Search
CPC ... H04B 7/0413; H04B 7/0452; H04W 88/02; G05B 19/4185
USPC .......................................................... 375/267
See application file for complete search history.

(56) References Cited

U.S. PATENT DOCUMENTS

| | | | |
|---|---|---|---|
| 8,744,373 B2* | 6/2014 | Pourseyed | H01Q 21/28 455/101 |
| 9,385,795 B1* | 7/2016 | Ananthanarayanan | H04L 5/08 |
| 2010/0214174 A1* | 8/2010 | Guan | H01Q 1/243 343/700 MS |
| 2011/0151811 A1 | 6/2011 | Lagnado et al. | |
| 2014/0266936 A1 | 9/2014 | Emmanuel et al. | |
| 2016/0261050 A1* | 9/2016 | Sharawi | H01Q 1/243 |
| 2017/0352961 A1* | 12/2017 | Morrison | H01Q 9/0464 |

FOREIGN PATENT DOCUMENTS

| | | |
|---|---|---|
| CN | 104051841 A | 9/2014 |
| CN | 105490714 A | 4/2016 |
| CN | 106571538 A | 4/2017 |

* cited by examiner

*Primary Examiner* — Leila Malek

(57) ABSTRACT

Antennas and MIMO antenna arrays in a housing of an electronic device are described. The MIMO antenna array includes a plurality of antennas. At least one of the antennas has operating frequency ranges of 700 MHz-900 MHz, 1700 MHz-2100 MHz, and 3 GHz-5 GHz. The MIMO antenna array may include 8 or 10 antennas.

24 Claims, 23 Drawing Sheets

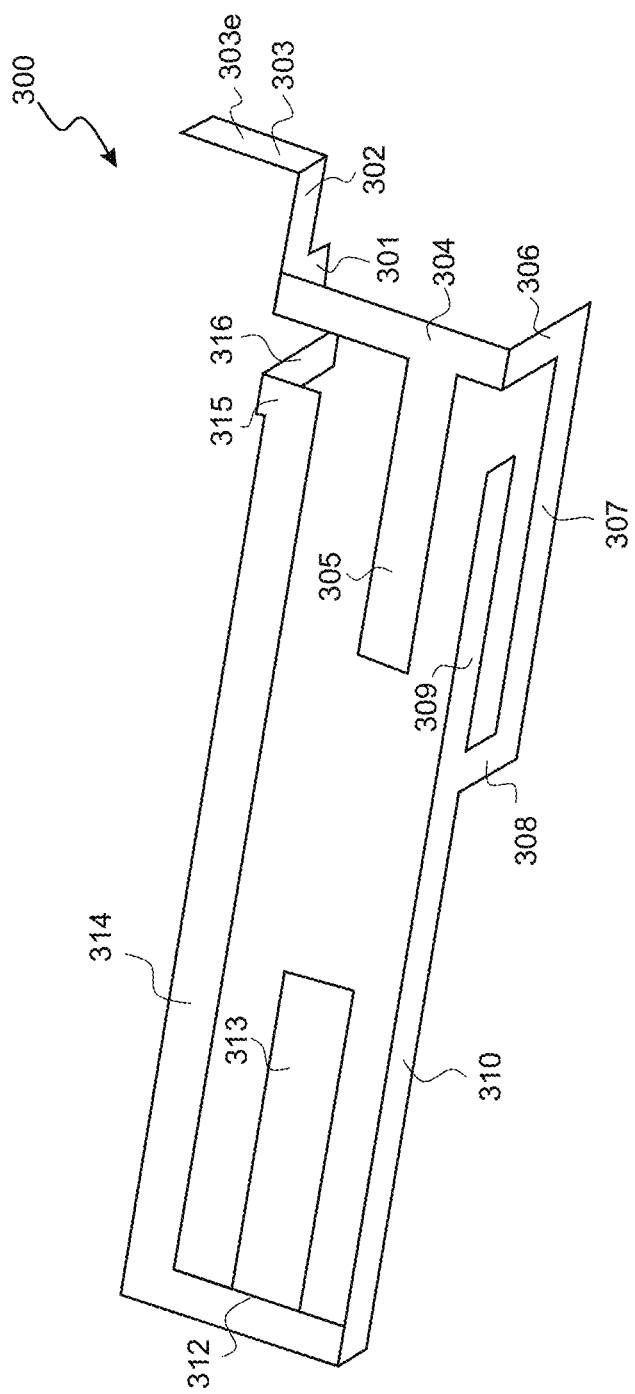
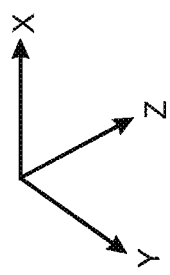
Fig. 7

MULTI-BAND ANTENNAS AND MIMO ANTENNA ARRAYS FOR ELECTRONIC DEVICE

The present disclosure relates to antennas, and in particular, to broadband antennas and arrangements of antenna arrays in an electronic device.

BACKGROUND

Ever more functionality and technology are being integrated into modern electronic devices, such as smart phones. Sometimes, additional hardware may need to be added to the electronic device in order to provide new functionality. For example, additional 5G antennas will be required to support 5G technologies in a modern electronic device and to co-exist with existing hardware, such as 2G-4G antennas. The term "5G" stands for fifth generation wireless telecommunications technologies, and the term "2G-4G" means the second to the fourth generation wireless telecommunications technologies.

There is, however, very limited available space in the electronic device for placing additional antennas. Additionally, placement of the additional 5G antennas in the electronic device is limited by the placement of the existing 2G-4G antennas, which are generally placed on the top and bottom portions of the PCB board of the electronic devices. For example, in order to achieve desired performance, 5G antennas are generally not placed on top of the existing 2G-4G antennas without any space between the 5G antennas and the 2G-4G antennas.

As well, 5G frequency bands in different countries may range from 3 GHz to 5 GHz. Therefore, it is desirable to provide additional antennas in an electronic device that covers these potential 5G frequency bands.

SUMMARY

The present description describes example embodiments of broadband antennas and arrangements of antenna arrays. The antennas and arrangements of antenna arrays have broad bandwidth, high efficiency, and good impedance matching with the output impedance of the transceiver of the electronic device, such as a 5G electronic device. In at least some configurations, the antenna arrays support previous 2G, 3G, and 4G RATs in 700 MHz-960 MHz and 1700 MHz-2100 MHz, and 5G RATs in 3 GHz-5 GHz.

In at least some configurations, the antenna arrays are placed in the electronic device based on the actual arrangement of the existing hardware and available free space in the electronic device. Therefore, the antennas and antenna arrays can be conveniently introduced in electronic device without interfering or modifying the existing arrangement of the hardware components of electronic device.

In at least some configurations, the antenna arrays allow the electronic device to support 2G, 3G, 4G and 5G RATs at the same time without existing 2G, 3G and 4G antennas. Accordingly, the antennas and antenna arrays occupy less free space in the electronic device and thus is more flexible to implement in the electronic device.

According to an aspect, there is provided an electronic device that includes a radio frequency (RF) communications circuit; and a multiple input multiple output (MIMO) antenna array including a plurality of antennas connected to the RF communications circuit, wherein at least one of the antennas has operating frequency ranges of 700 MHz-900 MHz, 1700 MHz-2100 MHz, and 3 GHz-5 GHz.

Optionally, in any of the preceding aspects, each of the antennas has a first total efficiency of at least 60% in 3 GHz-5 GHz.

Optionally, in any of the preceding aspects, any two of the antennas have a mutual coupling level less than −12 dB in 700 MHz-900 MHz, 1700 MHz-2100 MHz, and 3 GHz-5 GHz.

Optionally, in any of the preceding aspects, the antennas have a common operating frequency range of 3-5 GHz.

Optionally, in any of the preceding aspects, the at least one antenna is placed on a bottom portion of the electronic device and serves as a main antenna in frequency ranges of 700 MHz-900 MHz, 1700 MHz-2100 MHz.

Optionally, in any of the preceding aspects, the plurality of antennas include a second antenna that has operating frequency ranges of 700 MHz-900 MHz, 1700 MHz-2100 MHz, and 3 GHz-5 GHz.

Optionally, in any of the preceding aspects, the second antenna is placed on a top portion of the electronic device and serves as a diversity antenna in frequency ranges of 700 MHz-900 MHz, 1700 MHz-2100 MHz.

Optionally, in any of the preceding aspects, the MIMO antenna array including 8 antennas.

Optionally, in any of the preceding aspects, the MIMO antenna array including 10 antennas.

According to another aspect, there is provided a multiple input multiple output (MIMO) antenna array that includes a plurality of antennas for transmitting RF signals from a transmitter of an electronic device and for receiving external RF signals, wherein at least one of the antennas has operating frequency ranges of 700 MHz-900 MHz, 1700 MHz-2100 MHz, and 3 GHz-5 GHz.

Optionally, in any of the preceding aspects, each of the antennas has a first total efficiency of at least 60% in 3 GHz-5 GHz.

Optionally, in any of the preceding aspects, the at least one antenna further has a second total efficiency of at least 50% in 700 MHz-900 MHz and 1700 MHz-2100 MHz.

Optionally, in any of the preceding aspects, the at least one antenna further has a second scattering parameter $S_{Rx\text{-}Rx}$ of less than or equal to −10 dB in 700 MHz-900 MHz and 1700 MHz-2100 MHz.

Optionally, in any of the preceding aspects, any two of the antennas have a mutual coupling level less than −12 dB in 700 MHz-900 MHz, 1700 MHz-2100 MHz, and 3 GHz-5 GHz.

Optionally, in any of the preceding aspects, the antennas have a common operating frequency range of 3-5 GHz.

Optionally, in any of the preceding aspects, the MIMO antenna array includes 8 antennas.

Optionally, in any of the preceding aspects, the MIMO antenna array includes 10 antennas.

According to another aspect, there is provided an antenna that includes a plurality of radiating members for radiating the RF signals and for receiving the external RF signals; a feeding pin electrically connected with a first one of the radiating members for receiving RF signals from a transmitter of an electronic device and for transmitting external RF signals to a receiver of the electronic device; and a shorting pin electrically connected with a second one of the radiating members for electrically connecting the antenna with a common ground, wherein the antenna has operating frequency ranges of 700 MHz-900 MHz, 1700 MHz-2100 MHz, and 3 GHz-5 GHz.

BRIEF DESCRIPTION OF THE DRAWINGS

Reference will now be made, by way of example, to the accompanying drawings which show example embodiments of the present disclosure, and in which:

FIG. 7 is a front perspective view of an antenna, according to example embodiments.

Similar reference numerals may have been used in different figures to denote similar components.

DESCRIPTION OF EXAMPLE EMBODIMENTS

Newer radio access technologies (RATs), for example 5G wireless technologies, require faster data rates and greater data streams in the air interface. A multiple-input and multiple-output (MIMO) antenna array may be used to increase the capacity of wireless channels without extra radiation power or spectrum bandwidth. In a multipath wireless environment, the capacity of wireless channels generally increases in proportion to the number of transmitting and receiving antennas of a MIMO antenna array.

Figure 1:
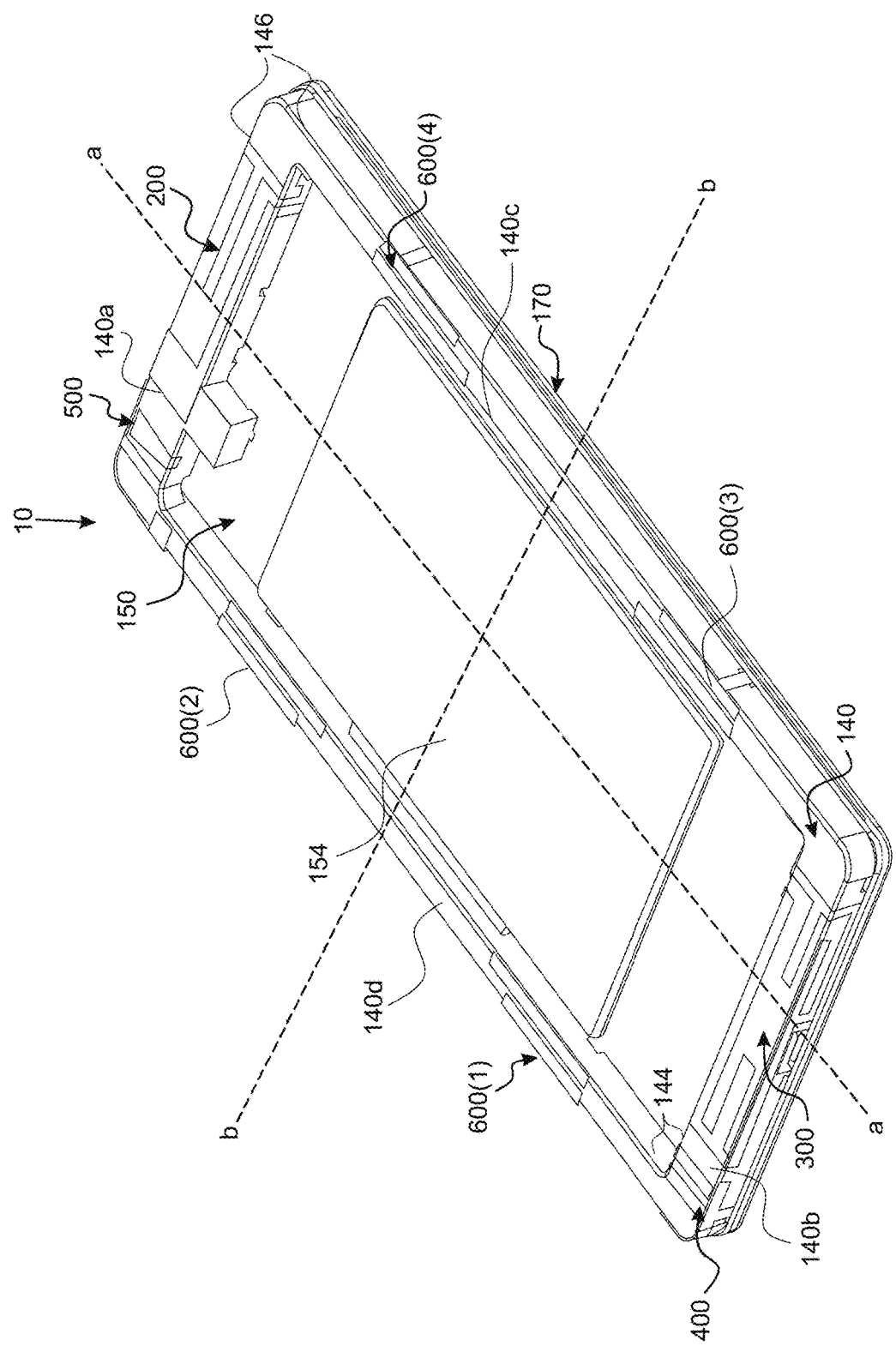
FIG. 1 is a back perspective view of an electronic device having an array of eight antennas, according to a first arrangement of example embodiments.

In this regard, FIG. 1 illustrates a back perspective view of an exemplary electronic device 10 that implements MIMO antenna array according to the present disclosure. The electronic device 10 may be a mobile device that is enabled to receive and transmit radio frequency (RF) signals including, for example, a tablet, a smart phone, a Personal Digital Assistant (PDA), or an Internet of Things (IOT) device, among other things.

Figure 2:
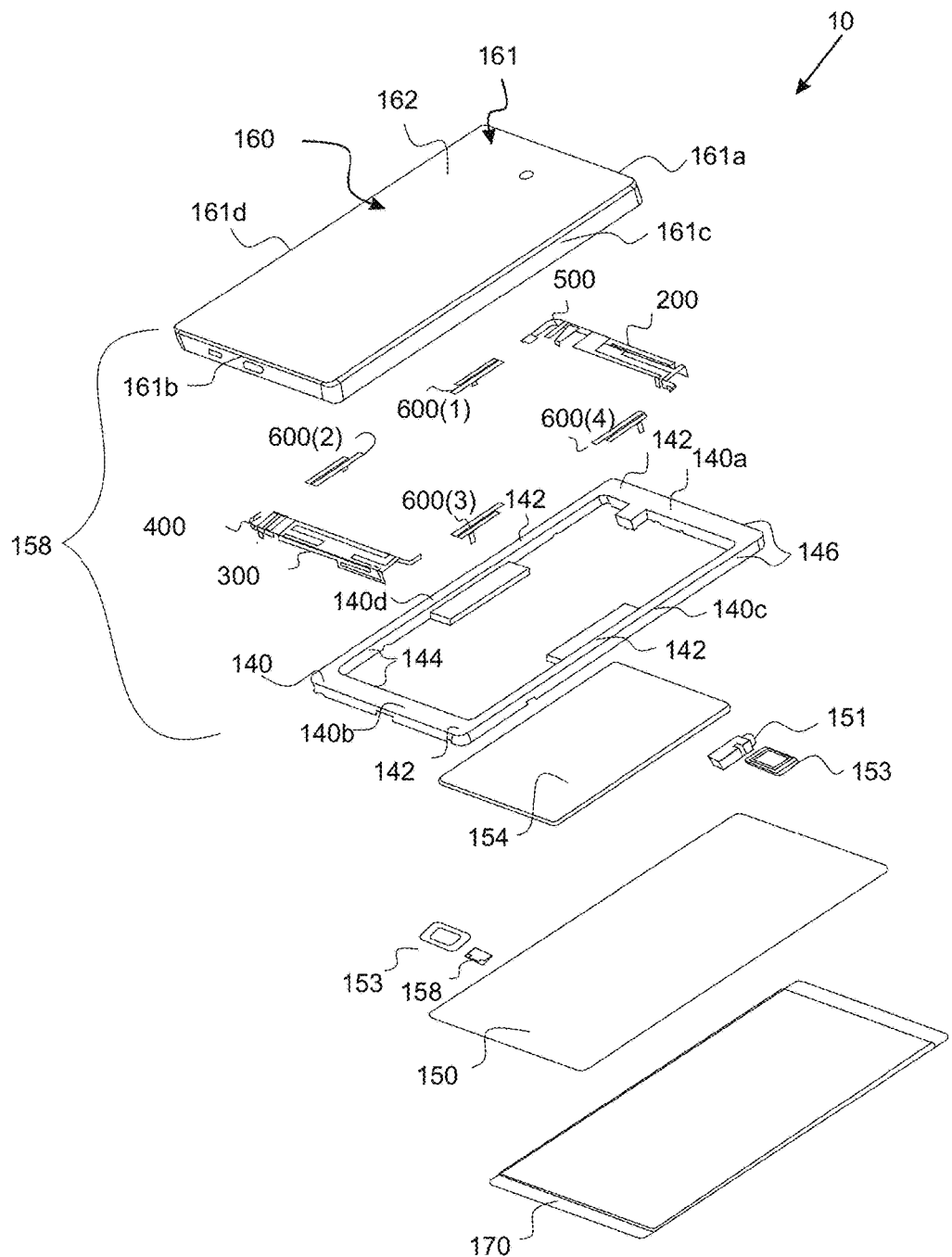
FIG. 2 is an exploded view of the electronic device of FIG. 1.

As illustrated in the example of FIG. 2, the electronic device 10 includes a housing 158 that supports and houses, among other things, a MIMO antenna array (described in detail below), a PCB board 150 populated with electronic components, a battery 154, and a display screen 170.

An electronic device intended for handheld use typically has a rectangular prism configuration with a top and bottom of the device that correspond to the orientation that the device is most commonly held in during handheld use, and in this regard the terms "top", "bottom", "front" and "back" as used in the present disclosure refer to the most common use orientation of the electronic device 10 as intended by the device manufacturer, while recognizing that some devices can be temporarily orientated to different orientations (for example from a portrait orientation to a landscape orientation). In examples in which the electronic device 10 has a display screen 170, the term "front" refers to the surface of the device on which screen 170 is located.

In the example device shown in FIGS. 1 and 2, a plurality of antennas are arranged in the electronic device 10 to implement an exemplary MIMO antenna array, which includes antennas 200, 300, 400, 500, and 600 (1)-600(4) (referred generically as antenna 600).

Antennas 200 and 300 are configured to operate in the same frequency ranges, for example, in 700 MHz-960 MHz, 1700 MHz-2100 MHz, and 3 GHz-5 GHz. In other words, antennas 200 and 300 are capable of supporting existing 2G, 3G, and 4G RATs, and newer 5G RATs. Antennas 400, 500, and 600 are configured to operate in the same frequency range, for example, from 3 GHz-5 GHz.

In example embodiments, antennas 600 each have an identical physical configuration different from that of antennas 200, 300, 400, and 500. Despite physical differences, antennas 400, 500, and 600 are configured to operate in the same frequency range, for example, in 3 GHz-5 GHz.

In the example embodiment of FIGS. 1-2, the electronic device 10 includes an antenna support member 140 that functions as an antenna carrier for antennas 200, 300, 400, 500, and 600 (collectively, the "antenna array"). In the example of FIG. 2, the electronic device 10 further includes a housing frame 160 for enclosing the hardware of electronic device 10, including the antenna array and antenna support member 140. The housing frame 160 in the example of FIG. 2 includes a back cover 162. Although the housing frame 160 and antenna support member 140 are shown as two components in FIG. 2, in at least some example embodiments, features of support member 140 are integrated into the housing frame 160 to provide a housing 158 with a unitary structure.

The antenna support member 140 includes a top portion 140a and a bottom portion 140b interconnected by two parallel side portions 140c and 140d. Each of the top portion 140a, bottom portion 140b, and two side portions 140c and 140d defines a respective back surface 142 that is substantially parallel to and faces an opposite direction than the display screen 170, an inner surface 144 facing the inside of the electronic device 10, and an outer surface 146 facing the outside of the electronic device 10. Both the inner surface 144 and the outer surface 146 are substantially orthogonal to the back surface 142. The back, inner, and outer surfaces 142, 144, 146 of the support member 140 provide support to the antenna array without interfering with the other hardware components of the electronic device 10. The inner surfaces 144 of the top portion 140a, bottom portion 140b, and two side portions 140c and 140d collectively form a rectangular perimeter that defines a central region for receiving hardware components, such as a battery 154 and some of the electronic components populated on the PCB 150. The support member 140 may be placed on top of a periphery of the PCB 150. The support member 140 may also be attached to the housing frame 160, for example by adhesives, or, as noted above, be integrated in the housing frame 160. The configuration of the support member 140 may be varied as long as it provides support to the antenna array at selected positions inside the electronic device 10 without interfering with the arrangement of the other hardware components of the electrical device 10.

In some example embodiments, the PCB 150 includes a plurality of layers including at least one signal layer and at least one ground layer. The signal layer includes a plurality of conductive traces that each forms signal paths 116 between respective PCB pads (see FIG. 3). The ground layer of the PCB 150 provides shielding and a common ground reference in the PCB 150 for current returns of the electronic components, and includes a plurality of conductive traces that each form ground paths. Conductive vias are provided through the PCB 150 to extend the signal paths 116 and ground paths to surface connection points (such as pads) on the PCB 150. Electronic components are populated on the PCB 150 to form circuits capable of performing desired functions. Electronic components may include, for example, integrated circuit (IC) chips, capacitors, resistors, inductors, diodes, transistors and other components.

Figure 3:
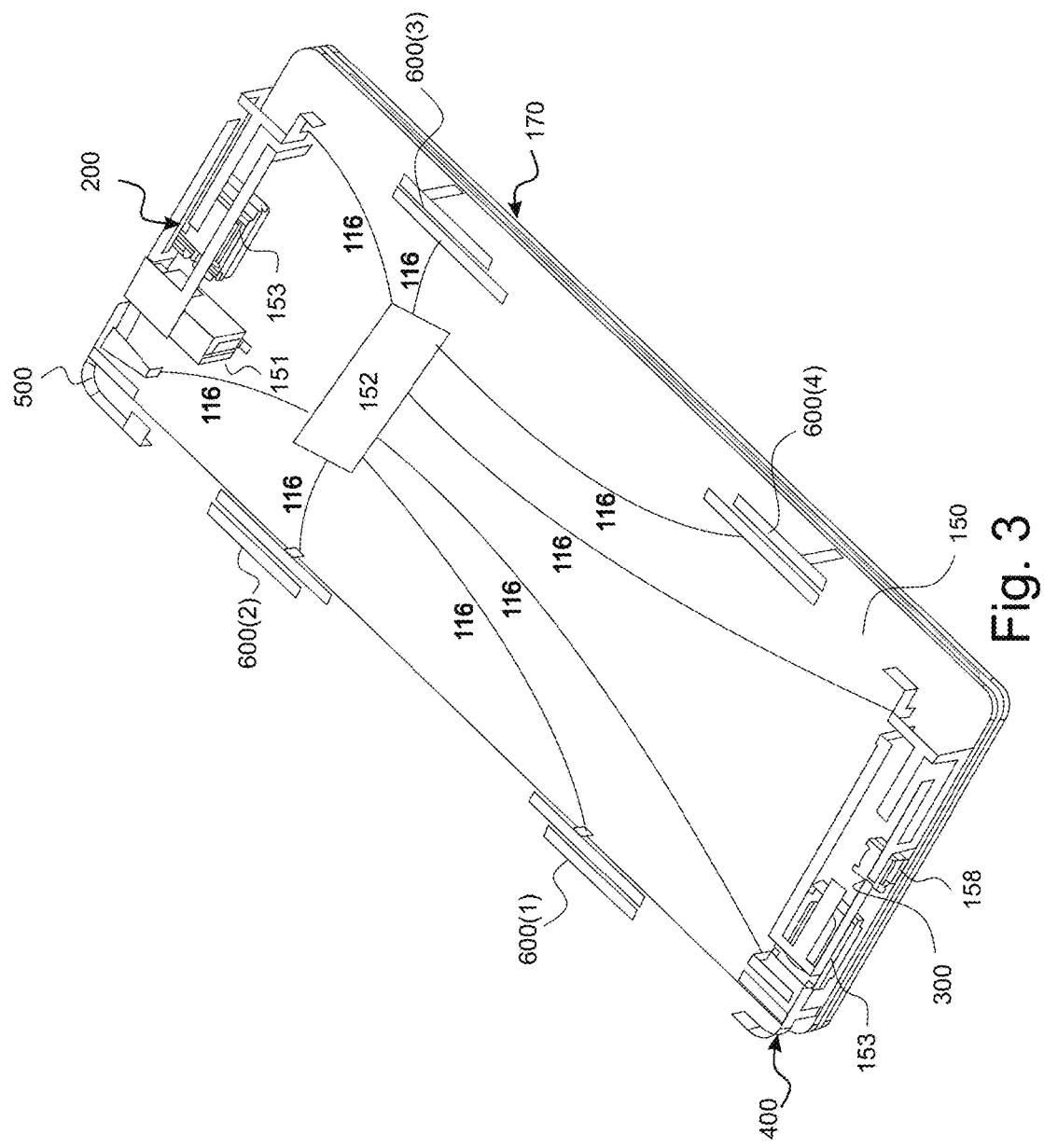
FIG. 3 is a back perspective view of the array of eight antennas placing on the Printed Circuit Board (PCB) of the electronic device, according to the first arrangement of example embodiments.

The electronic device 10 may also include other hardware such as sensors, speakers 153, headphone jack 158, USB jack 151, cameras and various circuits formed by electronic components populated on the PCB 150. In the example of FIG. 3, one speaker 153 and the headphone jack 158 are placed on the top portion of the PCB board 150 and under the antenna 200, and one speaker 153 and the USB jack 151 are placed on the bottom portion of the PCB board 150 and under the antenna 300.

In example embodiments, an RF communications circuit is implemented by PCB 150 and the components populated on PCB 150. In the example of FIG. 3, RF communications circuit includes matching circuits, switches, signal paths 116, ground path electrically connected to the ground plane of the PCB 150 (not shown) an RF transceiver circuit 152, electrical connectors (for example coax cables) for connecting to feeding pins of the antenna array, and other circuitry required for handling RF wireless signals. In example embodiments, RF transceiver circuit 152 can be formed from one or more integrated circuits and include modulating circuitry, power amplifier circuitry, low-noise input amplifiers and other components required to transmit or receive RF signals.

In an example, transceiver circuit 152 includes components to implement transmitter circuitry that modulates baseband signals to a carrier frequency and amplifies the resulting modulated RF signals. The amplified RF signals are then sent from the transceiver circuit 152 using signal path 116 and ground path via the ground plane of the PCB 150 to the antenna array which then radiates the amplified RF signals into a wireless transmission medium. In an example, transceiver circuit 152 also includes components to implement receiver circuitry that receives external carrier frequency modulated RF signals through signal path 116 and ground plane of the PCB 150 from the antenna array. The transceiver circuit 152 may include a low noise amplifier (LNA) for amplifying the received signals and a demodulator for demodulating the received RF signals to baseband.

In some examples, RF transceiver circuit 152 may be replaced with a transmit-only circuitry and in some examples, RF transceiver circuit 152 may be replaced with a receive-only circuitry.

In example embodiments, electronic device 10 includes a battery 154 for supplying power to electronic device 10. Battery 154 is electrically connected to a power supply circuit of the PCB 150. The power supply circuit then supplies power to circuits on the PCB 150, such as RF communications circuit, or to other electronic components of the electronic device 10. In an example illustrated in FIGS. 1-2, battery 154 is placed above the PCB 150 and inside the housing 158. Battery 154 may also be directly placed on PCB 150, for example, in the middle of PCB 150. Battery 154 may have a substantial size and occupy a substantial space of the housing 158. In an example, battery 154 has dimensions of 60 mm (width)×90 mm (length)×5 mm (height).

In some examples, battery 154 includes metal materials, and therefore absorbs RF wave energy radiated from the antenna array. In this case, efficiency of the antenna array without battery 154 in the electronic device 10 may be higher than that of the antenna array with the battery 154 in the electronic device 10, for example, by 10%.

As illustrated in FIG. 2, the housing frame 160 includes a planar element 162 with a perpendicular rim or sidewall 161 that extends downwardly around a perimeter of the planar element 162. The planar element 162 functions as a back cover of the electronic device 10. In an embodiment, the housing frame 160 securely encloses hardware of the electronic device 10, such as the antennas array, the antenna support member 140, the PCB board 150 and components populated thereon, the battery 154, the screen 170, and other hardware of the electronic device 10. In example embodiments, the display screen 170 is secured to a front of the housing frame 160.

In the examples of FIG. 2, the sidewall 161 of housing frame 160 includes a top wall portion 161a, a bottom wall portion 161b and two opposite side wall portions 161c and 161d that extend between the top and bottom wall portions 161a and 161b. In at least some example embodiments, the side wall portions 161c and 161d of the housing frame 160 have a greater length than the top wall portion 161a and bottom wall portion 161b of the housing frame 160.

In some embodiments, the support member 140 and housing 160 are integrated together into a unitary housing 158, and elements of the support member 140 can be integrated into the sidewall 161 to support to the antenna array at the respective positions shown in FIGS. 1-3. For example, the housing 158 may include protrusions extending from the sidewall 161 of the housing 160 and towards internal region of the housing 158 to provide support to the antenna array at their respective locations. In this example, support member 140 is replaced with the protrusions. In some example embodiments, the antenna array is secured to the support member 140 with an adhesive, for example, copper glue. The antenna array may also be secured to the support member 140 using other suitable mechanisms, such as a laser direct structuring (LDS) process, or an insert molding process, or a flex tape process in which each of antenna of the antenna array is mounted on a respective flex PCB that is then mounted using an adhesive to the support member 140.

In some example embodiment, the support member 140 and housing frame 160 are formed from suitable material, such as plastic, carbon-fiber materials or other composites, glass, or ceramics.

In some example embodiments, the PCB 150 of the electronic device 10 is located parallel to the back cover 162 and may be secured to standoffs that are located in housing 158.

In example embodiments, each antenna of the antenna array is secured in respective locations in the housing 158 that have been selected to optimize MIMO performance in the compact environment of the electronic device 10. For example, antenna locations are selected to achieve at least one of the following, or an optimal combination of the following: mitigate electric and magnetic interference with other components in the electronic device 10, mitigate coupling between antennas, and optimize diversity gain.

Antennas 200, 300, 400, 500 and 600 are formed from a conductive material, for example a metal, such as copper. Each of antennas 200, 300, 400, 500 and 600 is capable of transmitting RF signals received from a transmitter of the transceiver circuit 152 of the electronic device 10 and receiving external RF signals for further processing by a receiver of the transceiver circuit 152 of the electronic device 10.

As to be further discussed below, each 200, 300, 400, 500 and 600 has a plurality of radiating members for radiating the RF signals and for receiving the external RF signals, and a feeding pin electrically connected with one of the radiating members for receiving RF signals from a transmitter/transceiver 152 of the electronic device 10 and for transmitting external RF signals to a receiver/transceiver 152 of the electronic device, and a shorting pin electrically connected with another one of the radiating members for electrically connecting the antenna with the common ground provided by the PCB 150.

In the description below, an element of an antenna "substantially parallel to" a plane defined by an orthogonal X, Y, Z reference coordinate system also includes the element on the plane. An edge or end of an element "substantially parallel to" an axis also includes the edge or end overlap with axis. In the exemplary embodiments, antennas 200, 300, 400, 500, and 600 include planar elements, and the heights of the planar elements may be the same, for example, 5 mm.

Antenna 200

Figure 4:
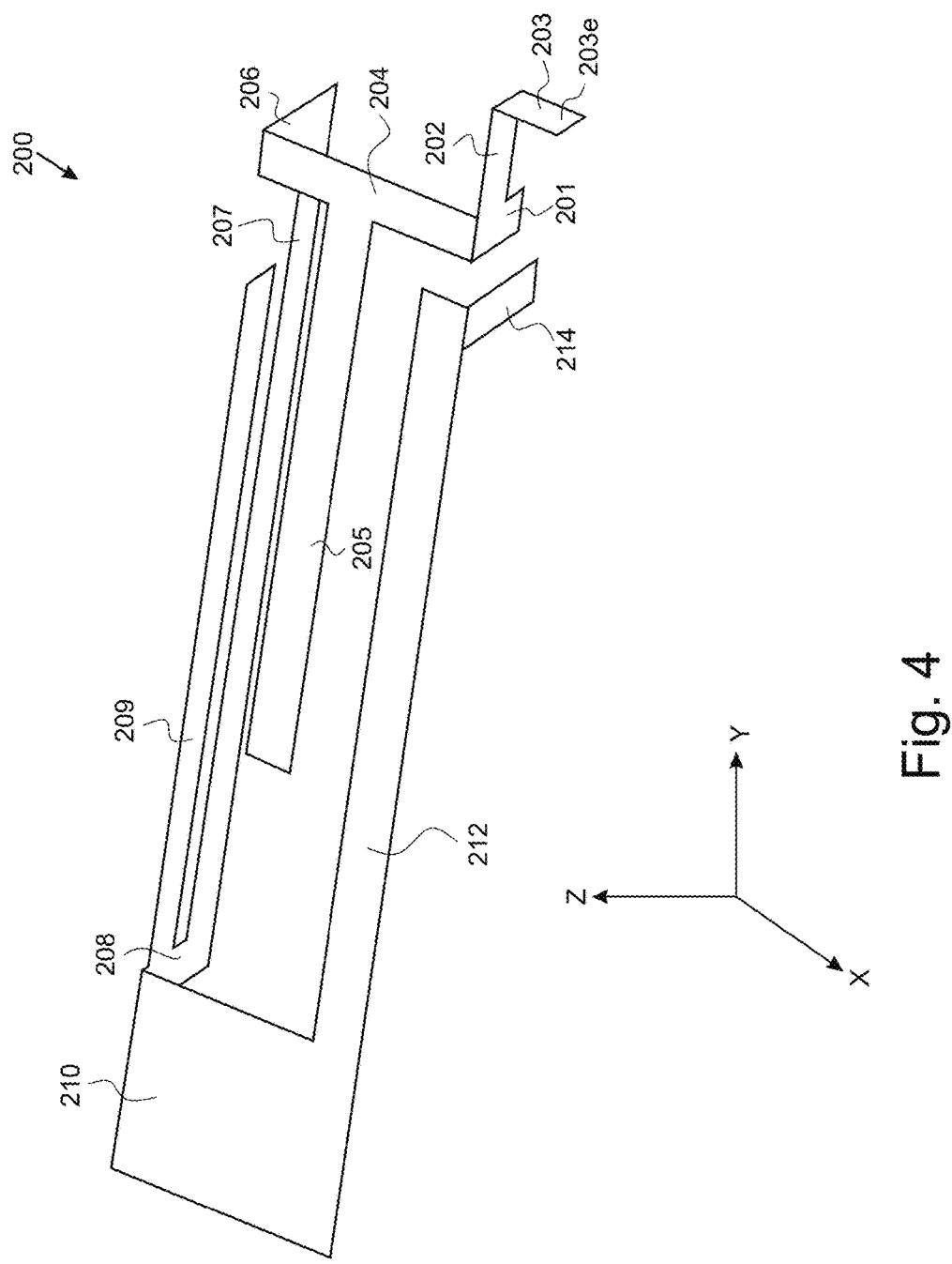
FIG. 4 is a front perspective view of an antenna, according to example embodiments.
Figure 5:
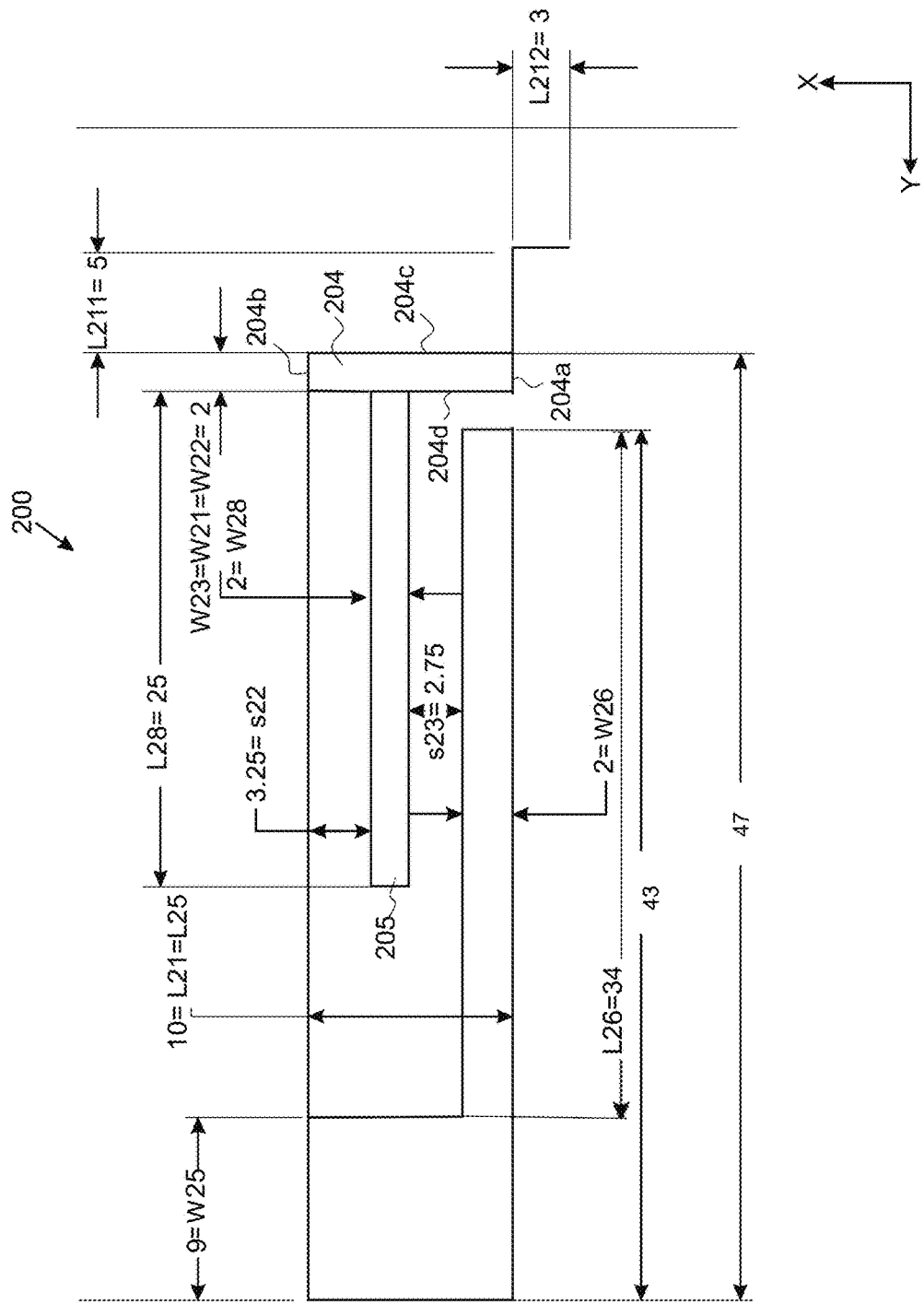
FIG. 5 is a top view of the antenna of FIG. 4.
Figure 6:
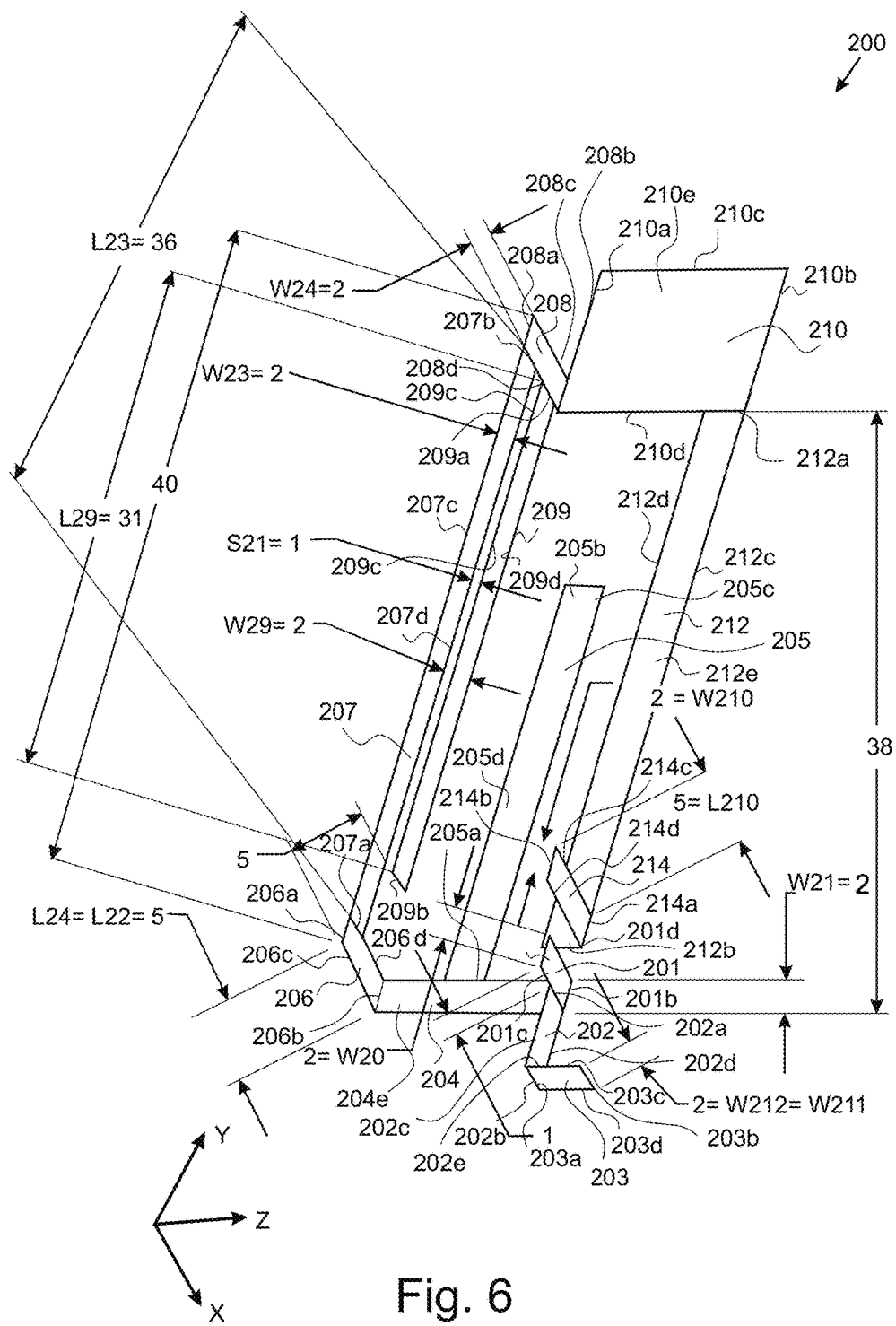
FIG. 6 is a bottom perspective view of the antenna of FIG. 4.

FIGS. 4-6 illustrate an example embodiment of antenna 200. Antenna 200 includes a feeding pin 201, radiating members 202, 203, 204, 205, 206, 207, 208, 209, 210, and 212, and a shorting pin 214. As illustrated in the example of FIGS. 4 and 6, the feeding pin 201, radiating members 202, 203, 204, 205, 206, 207, 208, 209, 210, and 212, and the shorting pin 214 are each substantially planar rectangular elements.

Each of radiating members 204, 205, 210, and 212 has a top surface and a bottom surface. Each of the feeding pin 201, radiating members 202, 203, 206, 207, 208, 209, and 212, and the shorting pin 214, has an inner surface and an outer surface. When antenna 200 is placed on the support member 140, for example, as illustrated in FIGS. 1 and 2, the top surfaces face the back cover 162 of the housing frame 160 and the bottom surface faces the screen 170 of the electronic device 10; the inner surfaces of radiating members 206, 207, 208 and 209 face the outer surface 146 of the support member 140, and the outer surfaces of radiating members 206, 207, 208 and 209 face the outside of the electronic device 10; inner surfaces of feeding pin 201, radiating members 202 and 203, and the shorting pin 214 face the inside of the electronic device 10, and outer surfaces of feeding pin 201, radiating members 202 and 203, and the shorting pin 214 face inner surface 144 of the support member 140.

The feeding pin 201 has two opposite ends 201a and 201b, and two opposite side edges 201c and 201d. Referring to the orthogonal X, Y, Z reference coordinate system shown in FIGS. 4 and 6, the feeding pin 201 is parallel to the Y-Z plane, and two side edges 201c and 201d are substantially parallel to the Z-axis. The rectangular radiating member 201 has a length L20 between opposite ends 201a and 201b, and a width W20 between opposite side edges 201c and 201d. For example, L20=3 mm, W20=2 mm.

In some embodiments, as illustrated in FIG. 3, the feeding pin 201 receives RF signals fed to antenna 200 from transceiver circuit 152. Similarly, RF signals received over an air interface by antenna 200 are fed through feeding pin 201 to transceiver 152. In some embodiments, a cable is used to connect the feeding pin 201 of antenna 200 to the transceiver 152 via a signal path 116 on the PCB board 150.

The rectangular radiating member 202 has two opposite ends 202a and 202b, and two opposite side edges 202c and 202d. The radiating members 201 and 202 are perpendicular to each other in the same planes. In the examples of FIGS. 4 and 6, the rectangular radiating member 202 is substantially parallel to the Z-Y plane. Two side edges 202c and 202d are substantially parallel to the Z-axis. The radiating member 202 has a length L211 between opposite ends 202a and 202b, and a width W211 between opposite side edges 202c and 202d. For example, L211=5 mm (FIG. 5), and W211=2 mm (FIG. 6). The end 202a is electrically connected with the side edge 201c and close to the end 201b, for example by a weld.

The rectangular radiating member 203 has two opposite ends 203a and 203b, and two opposite side edges 203c and 203d. The radiating members 202 and 203 are perpendicular to each other in two planes. In the examples of FIGS. 4 and 6, the rectangular radiating member 203 is substantially parallel to the Z-X plane. Two side edges 203c and 203d are substantially parallel to the X-axis. The radiating member 203 has a length L212 between opposite ends 203a and 203b and a width W212 between opposite side edges 203c and 203d. For example, L212=3 mm (FIG. 5) and W212=2 mm (FIG. 6). The end 203a is electrically connected with an end portion of radiating member 202 of the inner surface 202e and close to the end 202b, for example by a weld.

The rectangular radiating member 204 has two opposite ends 204a and 204b, and two opposite side edges 204c and 204d. The radiating members 201 and 204 are perpendicular to each other in two planes. In the examples of FIGS. 4 and 6, the rectangular radiating member 204 is parallel to the X-Y plane, and two side edges 204c and 204d are parallel to the X-axis. The rectangular radiating member 204 has a length L21 between opposite ends 204a and 204b, and a width W21 between opposite side edges 204c and 204d. For example, L21=10 mm (FIG. 5) and W21=2 mm (FIG. 5). The end 204a is electrically connected with an end portion of a bottom surface 204e of the feeding pin 201 and close to the end 201b, for example by a weld.

The rectangular radiating member 205 has two opposite ends 205a and 205b, and two opposite side edges 205c and 205d. The radiating members 204 and 205 are perpendicular to each other in the same plane. In the example of FIGS. 4-6, the rectangular radiating member 205 is substantially parallel to the X-Y plane. Two side edges 205c and 205d are substantially parallel to the Y-axis. The rectangular radiating member 205 has a length L28 between opposite ends 205a and 205b, and a width W28 between opposite side edges 205c and 205d. For example, L28=25 mm (FIG. 5) and W28=2 mm (FIG. 5). The end 205a is electrically connected with the side edge 204d between the ends 204a and 204b, for example by a weld. For example, the distance between side edge 205d and the end 204b is 3.25 mm (FIG. 5).

The rectangular radiating member 206 has two opposite ends 206a and 206b, and two opposite side edges 206c and 206d. The radiating members 204 and 206 are perpendicular to each other in two planes. In the example of FIGS. 4 and 6, the rectangular radiating member 206 is substantially parallel to the Z-Y plane. Two side edges 206c and 206d are substantially parallel to the Z-axis. The rectangular radiating member 206 has a length L22 between opposite ends 206a and 206b, and a width W22 between opposite side edges 206c and 206d. For example, L22=5 mm (FIG. 6) and W22=2 mm (FIG. 5). The end 206b is electrically connected with an end portion of the bottom surface 204e of radiating member 204 and close to the distal end 204b, for example by a weld.

The rectangular radiating member 207 has two opposite ends 207a and 207b, and two opposite side edges 207c and 207d. The radiating members 206 and 207 are perpendicular to each other in the same plane. In the example of FIGS. 4 and 6, the rectangular radiating member 207 is substantially parallel to the Z-Y plane. Two side edges 207c and 207d substantially parallel to the Y-axis. The rectangular radiating member 207 has a length L23 between opposite ends 207a and 207b, and a width W23 between opposite side edges 207c and 207d. For example, L23=36 mm (FIG. 6) and W23=2 mm. The end 207a is electrically connected with side edge 206d and close to the distal end 206a, for example by a weld.

The rectangular radiating member 208 has two opposite ends 208a and 208b, and two opposite side edges 208c and 208d. The radiating members 207 and 208 are perpendicular to each other in the same plane. In the example of FIGS. 4 and 6, the rectangular radiating member 208 is substantially parallel to the Z-Y plane. Two side edges 208c and 208d are substantially parallel to the Z-axis. The rectangular radiating member 208 has a length L24 between opposite ends 208a and 208b, and a width W24 between opposite side edges 208c and 208d. For example, L24=5 mm (FIG. 6) and W24=2 mm (FIG. 6). The end 207b is electrically connected with side edge 208d and close to the distal end 208a, for example by a weld.

The rectangular radiating member 209 has two opposite ends 209a and 209b, and two opposite side edges 209c and 209d. The radiating members 208 and 209 are perpendicular to each other in the same plane. In the example of FIG. 6, the rectangular radiating member 209 is substantially parallel to the Y-Z plane. Two side edges 209c and 209d are substantially parallel to the Y-axis. The rectangular radiating member 209 has a length L29 between opposite ends 209a and 209b, and a width W29 between opposite side edges 209c and 209d. For example, L29=31 mm (FIG. 6) and W29=2 mm (FIG. 6). The end 209a is electrically connected with the side edge 208d and close to the end 208b, for example by a weld.

The radiating members 207 and 209 are substantially parallel to each other in the same plane. The side edge 209c is substantially parallel to the side edge 207d and define a space of uniform width S21 between side edges 209c and 207d. For example, S21=1 mm (FIG. 6). The side edge 209d is also substantially parallel to the side edge 203d and define a space of uniform width S22 between side edges 209d and 203d. For example, S22=3.25 mm (FIG. 5).

The rectangular radiating member 210 has two opposite ends 210a and 210b, and two opposite side edges 210c and 210d. The radiating members 208 and 210 are perpendicular to each other in two planes. In the example of FIG. 6, the rectangular radiating member 210 is substantially parallel to the X-Y plane. Two side edges 210c and 210d are substantially parallel to the X-axis. The rectangular radiating member 210 has a length L25 between opposite ends 210a and 210b, and a width W25 between opposite side edges 210c and 210d. For example, L25=10 mm and W25=9 mm (See FIG. 5). The end 208b is electrically connected with an end portion of a bottom surface 210e of radiating member 210, and close to the end 210a and the side edge 210d, for example by a weld.

The rectangular radiating member 212 has two opposite ends 212a and 212b, two opposite side edges 212c and 212d. The radiating members 210 and 212 are perpendicular to each other in the same plane. In the example of FIG. 6, the rectangular radiating member 212 is substantially parallel to the X-Y plane. Two side edges 212c and 212d are substantially parallel to the Y-axis. The rectangular radiating member 212 has a length L26 between opposite ends 212a and 212b, and a width W26 between opposite side edges 212c and 212d. For example, L26=34 mm and W26=2 mm (see FIG. 5). The end 212a is electrically connected with the side edge 210d and close to the end 210b, for example by a weld. The radiating members 205 and 212 are also parallel to each other in the same plane. The side edges 205c and 212d are substantially parallel with each other and define a space of uniform width S23. For example, S23=2.75 mm (FIG. 5).

The shorting pin 214 has two opposite ends 214a and 214b, and two opposite side edges 214c and 214d. The radiating members 212 and 214 are perpendicular to each other in two planes. In the example of FIG. 6, the shorting pin 214 is substantially parallel to the Z-Y plane. Two side edges 214c and 214d are substantially parallel to the Z-axis. The shorting pin 214 has a length L210 between opposite ends 214a and 214b, and a width W210 between opposite side edges 214c and 214d. For example, L210=5 mm and W210=2 mm (see FIG. 6). The end 214a is electrically connected with an end portion of a bottom surface 212e of the radiating member 212, and close to side edge 212c and the distal end 212b, for example by a weld.

The shorting pin 214 is used for electrically connecting the antenna 200 with the common ground of the PCB board 150. The common ground of PCB 150 provides a grounding plane for antenna 200. For example, the shorting pin 214 connects through a wire with the common ground of the PCB board 150 or connects with the common ground of the PCB board 150 via a spring contact.

With the exemplary dimensions illustrated in FIGS. 5-6, radiating members 204, 206, 207, 208, 210, and 212 collectively support a first operating frequency range of 700-960 MHz; radiating members 204, 205, 206, 207, 208, 209, 210, and 212 collectively support a second operating frequency range of 1700-2100 MHz; and radiating members 202 and 203 collectively support a third operating frequency range of 3-5 GHz. Collectively, the combination of the radiating members 202, 203, 204, 205, 206, 207, 208, 209, 210, and 212 in this example allow antenna 200 to operate over the frequency ranges of 700-960 MHz, 1700-2100 MHz, and 3-5 GHz with desired performance. In other words, antenna 200 is capable of supporting 2G, 3G, 4G and 5G RATs at the same time. As such, antenna 200 can replace existing 2G, 3G, and 4G antennas placed in the electronic device 10, such as the diversity antenna placed on the top portion of electronic device 10, and support 2G, 3G, 4G, and 5G RATs at the same time without increasing total number of the antennas in electronic device 10.

Structure and dimensions of antenna 200 are determined based on actual arrangements of the existing hardware on the top portion of the PCB 150 and available space in the electronic device 10. As illustrate in FIG. 3, for example, antenna 200 is placed above headphone jack 151 and speaker 153 on the PCB. Therefore, antenna 200 can be conveniently implemented in the electronic device 10 to support 2G-5G RATs without modifying the existing hardware.

Structure of antenna 200 in FIGS. 4-6 may be varied. In an example, two or more of the feeding pin 201, radiating members 202, 203, 204, 205, 206, 207, 208, 209, 210, and 212, and the shorting pin 214 form one radiating member. For example, radiating members 204 and 205 form one radiating member, which is welded with shorting pin 201 and radiating member 206, or radiating members 206, 207, 208, and 209 form one radiating member that is welded with radiating members 204 and 210.

In another example, the feeding pin 201, radiating members 202, 203, 204, 205, 206, 207, 208, 209, 210, and 212, and the shorting pin 214 (collectively, the "elements") are formed from a planar conductive sheet. For example, antenna 200 can be made with the following steps:

1) cut the planar conductive sheet to form the elements based on the structure and dimensions illustrated in FIGS. 4-6;
2) fold feeding pin 201, radiating members 202 and 203 by ninety degrees with respect to radiating member 204 along the line defined by the end 204a so that the outer surfaces of radiating members 201, 202 and 203 face the inner surface 144 of support member 140;
3) fold radiating member 203 by ninety degrees with respect to radiating member 202 along the line defined by the end 203a so that the outer surface of radiating member 203 faces the inner surface 144 of support member 140;
4) fold radiating members 206, 207, 208 and 209 by ninety degrees with respect to radiating member 204 and 210 along the line defined by the end 206b and 208b so that the inner surfaces of radiating members 206, 207, 208 and 209 face the outer surface 146 of the support member 140; and
5) fold the shorting pin 214 by ninety degrees with respect to the radiating member 212 along the line defined by the end 214a so that the outer surface of the shorting pin 214 faces the inner surface 144 of support member 140.

The order of steps 1)-5) may be varied.

Antenna 300

Figure 8:
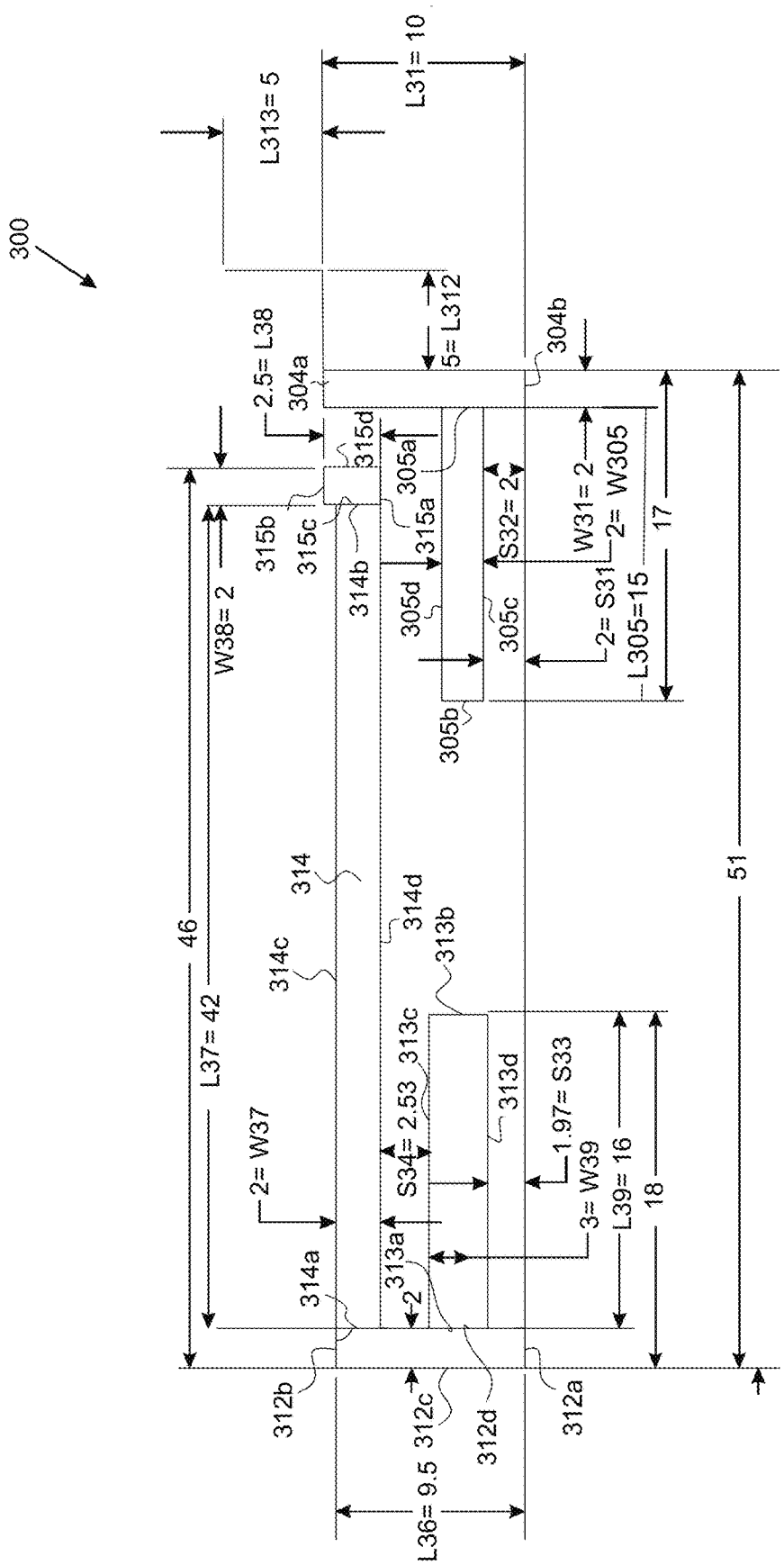
FIG. 8 is a top view of the antenna of FIG. 7.
Figure 9:
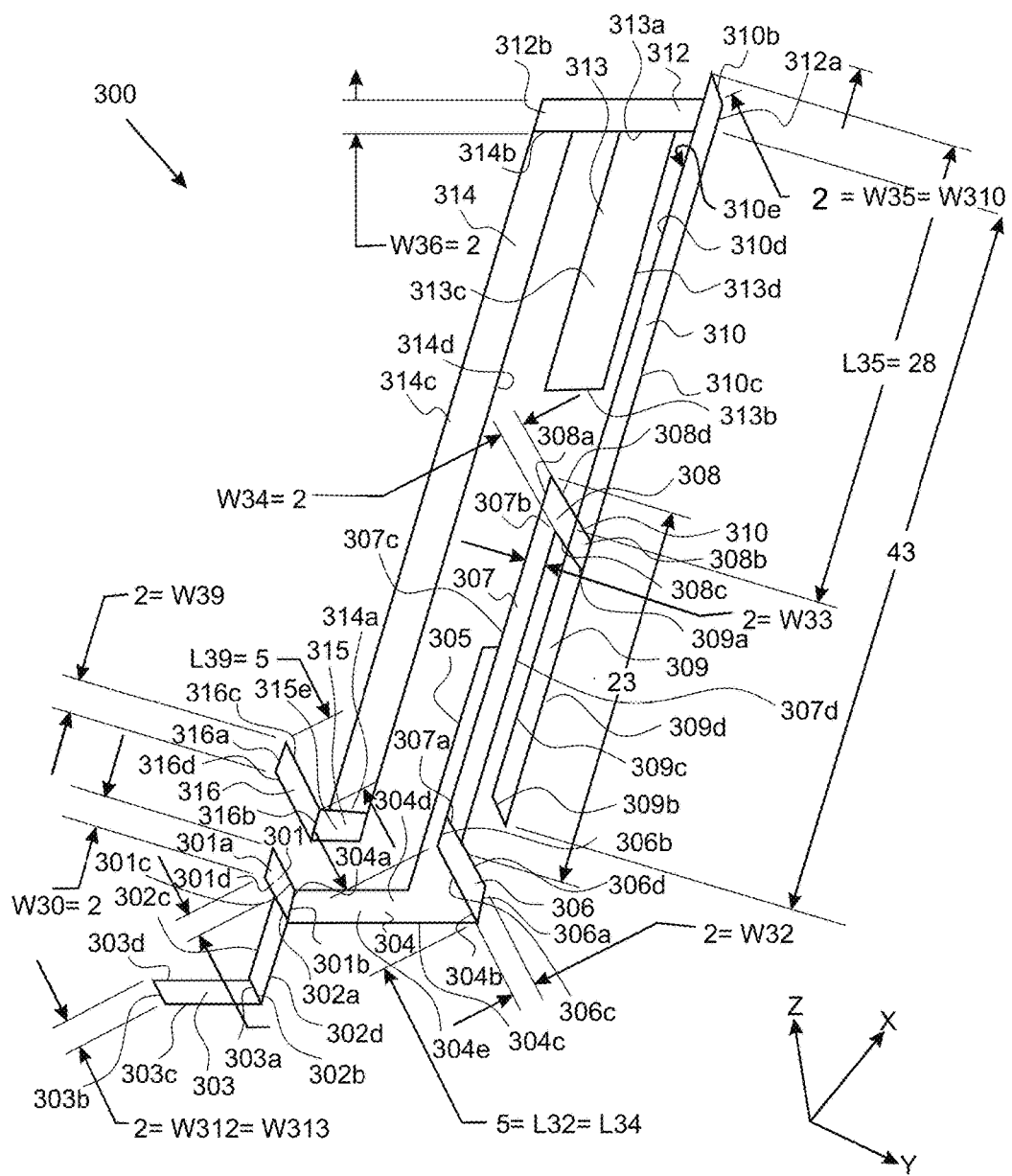
FIG. 9 is a bottom perspective view of the antenna of FIG. 7.

FIGS. 7, 8 and 9 illustrate an example embodiment of antenna 300. Antenna 300 includes a feeding pin 301, radiating members 302, 303, 304, 305, 306, 307, 308, 309, 310, 312, 313, 314, and 315, and a shorting pin 316. As illustrated in the examples in FIGS. 7 and 9, the feeding pin 301, radiating members 302, 303, 304, 305, 306, 307, 308, 309, 310, 312, 313, 314, and 315, and the shorting pin 316 are each substantially planar rectangular elements.

Each of radiating members 304, 305, 312, 313, 314 and 315 has a top surface and a bottom surface. Each of the feeding pin 301, radiating members 302, 303, 306, 307, 308, 309, and 310, and the shorting pin 316 has an inner surface and an outer surface. When antenna 300 is placed on the support member 140, for example, as illustrated in FIGS. 1 and 2, the top surface faces the back cover 162 of the housing frame 160 and the bottom surface faces the screen 170 of the electronic device 10; the inner surfaces of radiating members 306, 307, 308, 309 and 310 face the outer surface 146 of the support member 140, and the outer surfaces of radiating members 306, 307, 308, 309 and 310 face the outside of the electronic device 10; inner surfaces of feeding pin 301, radiating members 302 and 303, and the shorting pin 316 face the inside of the electronic device 10, and outer surfaces of feeding pin 301, radiating members 302 and 303, and the shorting pin 316 face inner surface 144 of the support member 140.

The feeding pin 301 has two opposite ends 301a and 301b, and two opposite side edges 301c and 301d. Referring to the orthogonal X, Y, Z reference coordinate system in FIGS. 7 and 9, the feeding pin 301 is substantially parallel to the X-Z plane, and two side edges 310c and 301d are substantially parallel to Z-axis. The feeding pin 301 has a length L30 between opposite ends 301a and 301b, and a width W30 between opposite side edges 301c and 301d. For example, L30=3 mm and W30=2 mm (see FIG. 9).

In some embodiments, as illustrated in FIG. 3, the feeding pin 301 receives RF signals fed to antenna 300 from transceiver circuit 152. Similarly, RF signals received over an air interface by antenna 300 are fed through feeding pin 301 to transceiver 152. In some embodiments, a cable is used to connect the feeding pin 301 of antenna 300 to the transceiver 152 via a signal path 116 on the PCB board 150.

The rectangular radiating member 302 has two opposite ends 302a and 302b, and two opposite side edges 302c and 302d. The feeding pin 301 and radiating member 302 are perpendicular to each other in the same plane. In the example of FIG. 9, the rectangular radiating member 302 is substantially parallel to the Z-X plane. Two side edges 302c and 302d are substantially parallel to the X-axis. The radiating member 302 has a length L312 between opposite ends 302a and 302b, and a width W312 between opposite side edges 302c and 302d. For example, L312=5 mm (FIG. 8) and W312=2 mm (FIG. 9). The end 302a is electrically connected, for example by a weld, with the side edge 301d and close to the end 301b.

The rectangular radiating member 303 has two opposite ends 303a and 303b, and two opposite side edges 303c and 303d. The radiating members 302 and 303 are perpendicular to each other in two planes. In the example of FIG. 9, the rectangular radiating member 303 is substantially parallel to the Z-Y plane. Two side edges 303c and 303d are substantially parallel to the Y-axis. The radiating member 303 has a length L313 between opposite ends 303a and 303b, and a width W313 between two opposite side edges 303c and 303d. For example, L313=5 mm (FIG. 8) and W313=2 mm (FIG. 9). The end 302b is electrically connected, for example by a weld, with an end portion of bottom surface 303e of radiating member 303 and close to the end 303a.

The rectangular radiating member 304 has two opposite ends 304a and 304b, and two opposite side edges 304c and 304d. The radiating members 301 and 304 are perpendicular to each other in two planes. In the example of FIG. 9, the rectangular radiating member 304 is substantially parallel to the X-Y plane, and two side edges substantially parallel to the Y-axis. The rectangular radiating member 304 has a length L31 between opposite ends 304a and 304b, and a width W31 between opposite side edges 304c and 304d. For example, L31=10 mm and W31=2 mm (see FIG. 8). The end 301b is electrically connected, for example by a weld, with an end portion of the bottom surface 304e of the radiating member 304 and close to the end 304a.

The rectangular radiating member 305 has two opposite ends 305a and 305b, and two opposite side edges 305c and 305d. The radiating members 304 and 305 are perpendicular to each other in the same plane. In the example of FIG. 8, the rectangular radiating member 305 is substantially parallel to the X-Y plane. Two side edges 305c and 305d are substantially parallel to the X-axis. The rectangular radiating member 305 has a length L305 between opposite ends 305a and 305b, and a width W305 between opposite side edges 305c and 305d. For example, L305=15 mm and W305=2 mm (see FIG. 8). The end 305a is electrically connected with the side edge 304d and between the ends 304a and 304b. In the example of FIG. 8, the distance between the side edge 305c and the end 304b is 2 mm.

The rectangular radiating member 306 has two opposite ends 306a and 306b, and two opposite side edges 306c and 306d. The radiating members 304 and 306 are perpendicular to each other in two planes. In the example of FIG. 9, the rectangular radiating member 306 is substantially parallel to the Z-X plane. Two side edges 304c and 304d substantially parallel to Z-axis. The rectangular radiating member 304 has a length L32 between opposite ends 304a and 304b, and a width W32 between opposite side edges 304c and 304d. For example, L32=5 mm and W32=2 mm (see FIG. 9). The end 306a is electrically connected, for example by a weld, with an end portion of bottom surface 304e of the radiating member 304 and close to the distal end 304b.

The rectangular radiating member 307 has two opposite ends 307a and 307b, and two opposite side edges 307c and 307d. The radiating members 306 and 307 are perpendicular to each other in the same plane. In the example of FIG. 9, the rectangular radiating member 307 is substantially parallel to the Z-X plane. Two side edges 307c and 307d are substantially parallel to the X-axis. The rectangular radiating member 307 has a length L33 between opposite ends 307a and 307b, and a width W33 between opposite side edges 307c and 307d. For example, L33=19 mm and W33=2 mm (see FIG. 9). The end 307a is electrically connected, for example by a weld, with side edge 306d and close to the distal end 306b.

The rectangular radiating member 308 has two opposite ends 308a and 308b, and two opposite side edges 308c and 308d. The radiating members 307 and 308 are perpendicular to each other in the same plane. In the example of FIGS. 7 and 9, the rectangular radiating member 308 is substantially parallel to the Z-X plane. Two side edges 308c and 308d are substantially parallel to the Z-axis. The rectangular radiating member 308 has a length L34 between opposite ends 308a and 308b, and a width W34 between opposite side edges 308c and 308d. For example, L34=5 and W34=2 mm (see FIG. 9). The end 307b is electrically connected, for example by a weld, with side edge 308c and close to the distal end 308a.

The rectangular radiating member 309 has two opposite ends 309a and 309b, and two opposite side edges 309c and 309d. The radiating members 308 and 309 are perpendicular to each other in the same plane. In the example of FIGS. 7 and 9, the rectangular radiating member 309 is substantially parallel to the Z-X plane. Two side edges 309c and 309d are substantially parallel to the X-axis. The rectangular radiating member 309 has a length L310 between opposite ends 309a and 309b, and a width W310 between opposite side edges 309c and 309d. For example, L310=15 mm and W310=2 mm (See FIG. 9). The end 309a is electrically connected, for example by a weld, with the side edge 308c and close to the ends 308b. The side edge 309c is substantially parallel to the side edge 307d and define a space of uniform width S31, for example S31=2 mm; the side edge 309d is substantially parallel to the side edge 305c and define a space of uniform width S32, for example S32=2 mm (FIG. 8).

The rectangular radiating member 310 has two opposite ends 310a and 310b, and two opposite side edges 310c and 310d. The radiating members 308 and 310 are perpendicular to each other in the same plane. In the example of FIGS. 7 to 9, the rectangular radiating member 310 is substantially parallel to the Z-X plane. Two side edges 310c and 310d are substantially parallel to the X-axis. The rectangular radiating member 310 has a length L35 between opposite ends 310a and 310b, and a width W25 between opposite side edges 310c and 310d. For example, L35=28 mm and W35=2 mm. The end 310a is electrically connected, for example by a weld, with the side edge 308d and close to the distal end 308b.

The rectangular radiating member 312 has two opposite ends 312a and 312b, and two opposite side edges 312c and 312d. The radiating members 310 and 312 are perpendicular to each other in two planes. In the example of FIGS. 7 to 9, the rectangular radiating member 312 is substantially parallel to the X-Y plane. Two side edges 312c and 312d are substantially parallel to the Y-axis. The rectangular radiating member 312 has a length L36 between opposite ends 312a and 312b, and a width W36 between opposite side edges 312c and 312d. For example, L36=9.5 mm and W36=2 mm (see FIG. 8). The end 312a is electrically connected, for example by a weld, with an end portion of inner surface 310e of radiating member 310 close to the edge 310c and the end 310b.

The rectangular radiating member 313 has two opposite ends 313a and 313b, and two opposite side edges 313c and 313d. The radiating members 312 and 313 are perpendicular to each other in the same plane. In the example of FIGS. 7 to 9, the rectangular radiating member 313 is substantially parallel to the X-Y plane. Two side edges 318c and 318d are substantially parallel to the X-axis. The rectangular radiating member 313 has a length L39 between opposite ends 313a and 313b, and a width W39 between opposite side edges 313c and 313d. For example, L39=16 mm and W39=3 mm (See FIG. 8). The end 313a is electrically connected, for example by a weld, with the side edge 312d and between the ends 312a and 312b. The side edge 313d is substantially parallel to the side edge 310c; side edge 313d and side edge 310c define a space of uniform width S33, for example S33=1.97 mm.

The rectangular radiating member 314 has two opposite ends 314a and 314b, and two opposite side edges 314c and 314d. The radiating members 312 and 314 are perpendicular to each other in the same plane. In the example of FIGS. 7 to 9, the rectangular radiating member 314 is substantially parallel to the X-Y plane. Two side edges 314c, 314d are substantially parallel to the X-axis. The rectangular radiating member 314 has a length L37 between opposite ends 314a and 314b, and a width W37 between opposite side edges 314c and 314d. For example, L37=42 mm and W37=2 mm (See FIG. 8). The end 314a is electrically connected, for example by a weld, with the side edge 312d close to the end 312b. The side edge 313c is substantially parallel to the side edge 314d and define a space of uniform width S34, for example, S34=2.53 mm (FIG. 8).

The rectangular radiating member 315 has two opposite ends 315a and 315b, and two opposite side edges 315c and 315d. The radiating members 314 and 315 are perpendicular to each other in the same plane. In the example of FIGS. 7 to 9, the rectangular radiating member 315 is substantially parallel to the X-Y plane. Two side edges 315c and 315d are substantially parallel to the Y-axis. The rectangular radiating member 315 has a length L38 between opposite ends 315a and 315b, and a width W38 between opposite side edges 315c and 315d. In the example of FIG. 7, L38=2.5 mm and W38=2 mm (FIG. 8). The end 314b is electrically connected, for example by a weld, with the side edge 315c and close to the end 315b.

Shorting pin 316 has two opposite ends 316a and 316b, and two opposite side edges 316c and 316d. Radiating member 315 and shorting pin 316 are perpendicular to each other in two planes. In the example of FIGS. 7 and 9, shorting pin 316 is substantially parallel to the Z-X plane. Two side edges 316c and 316d are substantially parallel to the Z-axis. Shorting pin 316 has a length L39 between opposite ends 316a and 316b, and a width W39 between opposite side edges 316c and 316d. For example, L39=5 mm and W39=2 mm (See FIG. 9). The end 316b is electrically connected, for example by a weld, with an end portion of the bottom surface 315e of radiating member 315 and close to the distal end 315a.

The shorting pin 316 is used for electrically connecting the antenna 300 with the common ground of the PCB board 150. The common ground of PCB 150 provides a grounding plane for antenna 300. For example, the shorting pin 316 connects through a wire with the common ground of the PCB board 150 or connects with the common ground of the PCB board 150 via a spring contact.

With the exemplary dimensions illustrated in FIGS. 7 to 9, radiating members 302 and 303 collectively support a first operating frequency range of 3-5 GHz, radiating members 304, 306, 307, 308, 310, 312, and 314 collectively support a second operating frequency range of 700-960 MHz, and radiating members 304, 305 306, 307, 308, 309, 310, 312, 313, 314, and 315 collectively support a third operating frequency range of 1700-2100 MHz. Therefore, the combination of radiating members 302, 303, 304, 305 306, 307, 308, 309, 310, 312, 313, 314, and 315 in this example allow antenna 300 to operate over the frequency ranges of 700-960 MHz, 1700-2100 MHz, and 3-5 GHz. In other words, antenna 300 is capable of supporting 2G, 3G, 4G and 5G RATs at the same time. As such, antenna 300 can substitute existing 2G, 3G, and 4G antenna, such as the main antenna placed on the bottom portion of the electronic device 10, and support 2G, 3G, 4G, and 5G RATs at the same time without increasing total number of the antennas in electronic device 10.

Structure and dimensions of antenna 300 are determined based on actual arrangements of the existing hardware on the bottom portion of the PCB 150 and available space in the electronic device 10. As illustrate in FIG. 3, for example, antenna 300 is placed above a speaker 153 and a USB socket 158 on the PCB 150. Therefore, antenna 300 can be conveniently implemented in the electronic device 10 to support 2G-5G RATs without modifying the existing hardware.

Structure of antenna 300 in FIGS. 7-9 may be varied. In an example, two or more of the feeding pin 301, radiating members 302, 303, 304, 305, 306, 307, 308, 309, 310, 312, 313, 314, and 315, and the shorting pin 316 form one radiating member. For example, radiating members 304 and 305 form one radiating member, which is welded with shorting pin 301 and radiating member 306, or radiating members 306, 307, 308, 309 and 310 form one radiating member that is welded with radiating members 304 and 312.

In another example, the feeding pin 301, radiating members 302, 303, 304, 305, 306, 307, 308, 309, 310, 312, 313, 314, and 315, and the shorting pin 316 (collectively, the "elements") are formed from a planar conductive sheet. For example, antenna 300 can be made with the following steps:

1) cut the planar conductive sheet to form the elements based on the structure and dimensions illustrated in FIGS. 7-9;
2) fold feeding pin 301, radiating members 302 and 303 by ninety degrees with respect to radiating member 304 along the line defined by the end 304a so that outer surfaces of radiating members 301, 302 and 303 face the inner surface 144 of support member 140;
3) fold radiating member 303 by ninety degrees with respect to radiating member 302 along the line defined by the end 303a so that the outer surface of radiating member 203 faces the inner surface 144 of support member 140;
4) fold radiating members 306, 307, 308, 309 and 310 by ninety degrees with respect to radiating member 304 and 312 along the line defined by the end 306b and 312a so that the inner surfaces of radiating members 306, 307, 308, 309 and 310 face the outer surface 146 of the support member 140; and
5) fold the shorting pin 316 by ninety degrees with respect to radiating member 315 along the line defined by the end 315b so that the outer surface of the shorting pin 316 faces the inner surface 144 of support member 140.

The order of steps 1)-5) may be varied.

Antenna 400

Figure 10:
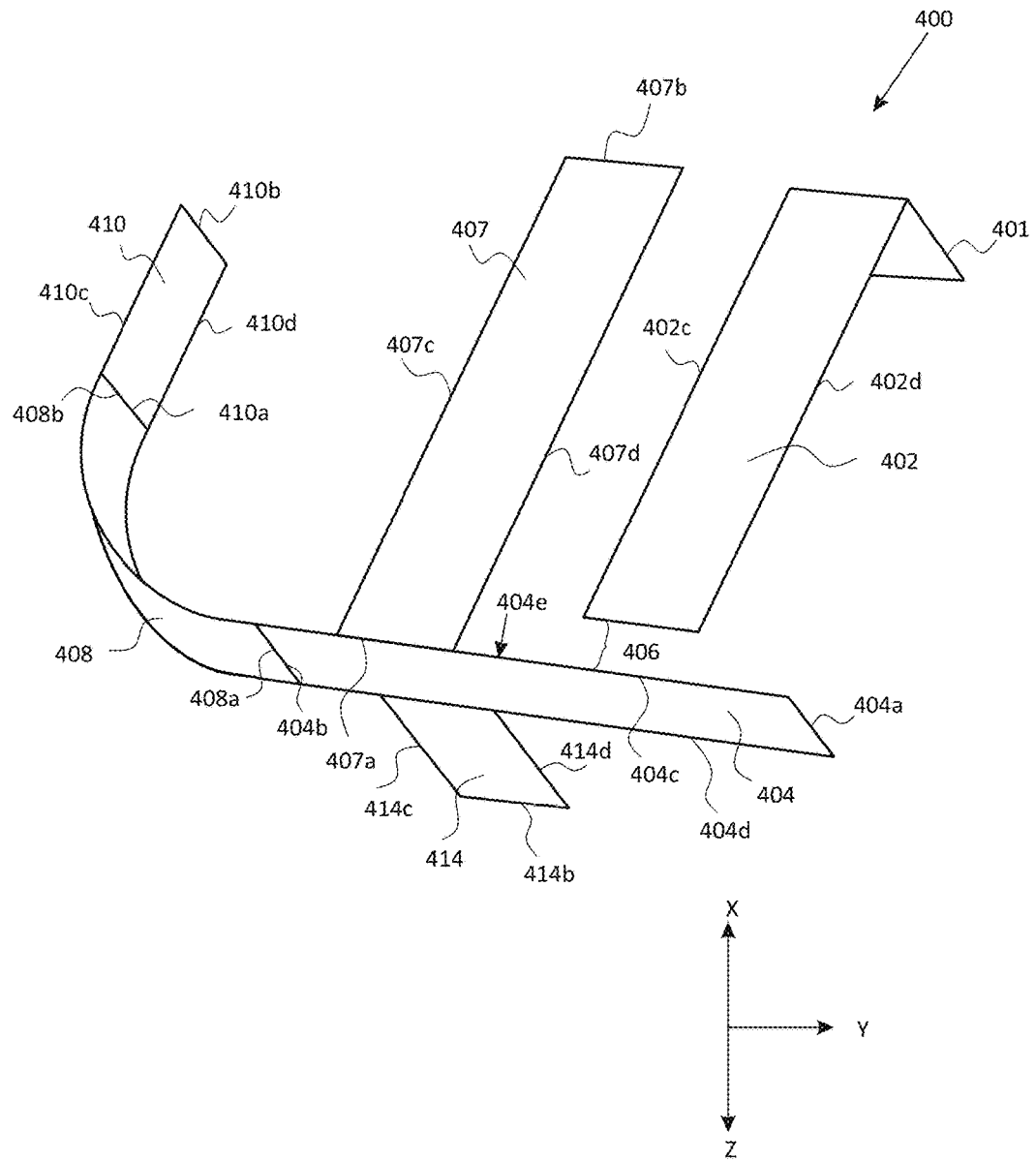
FIG. 10 is a front perspective view of an antenna, according to example embodiments.
Figure 11:
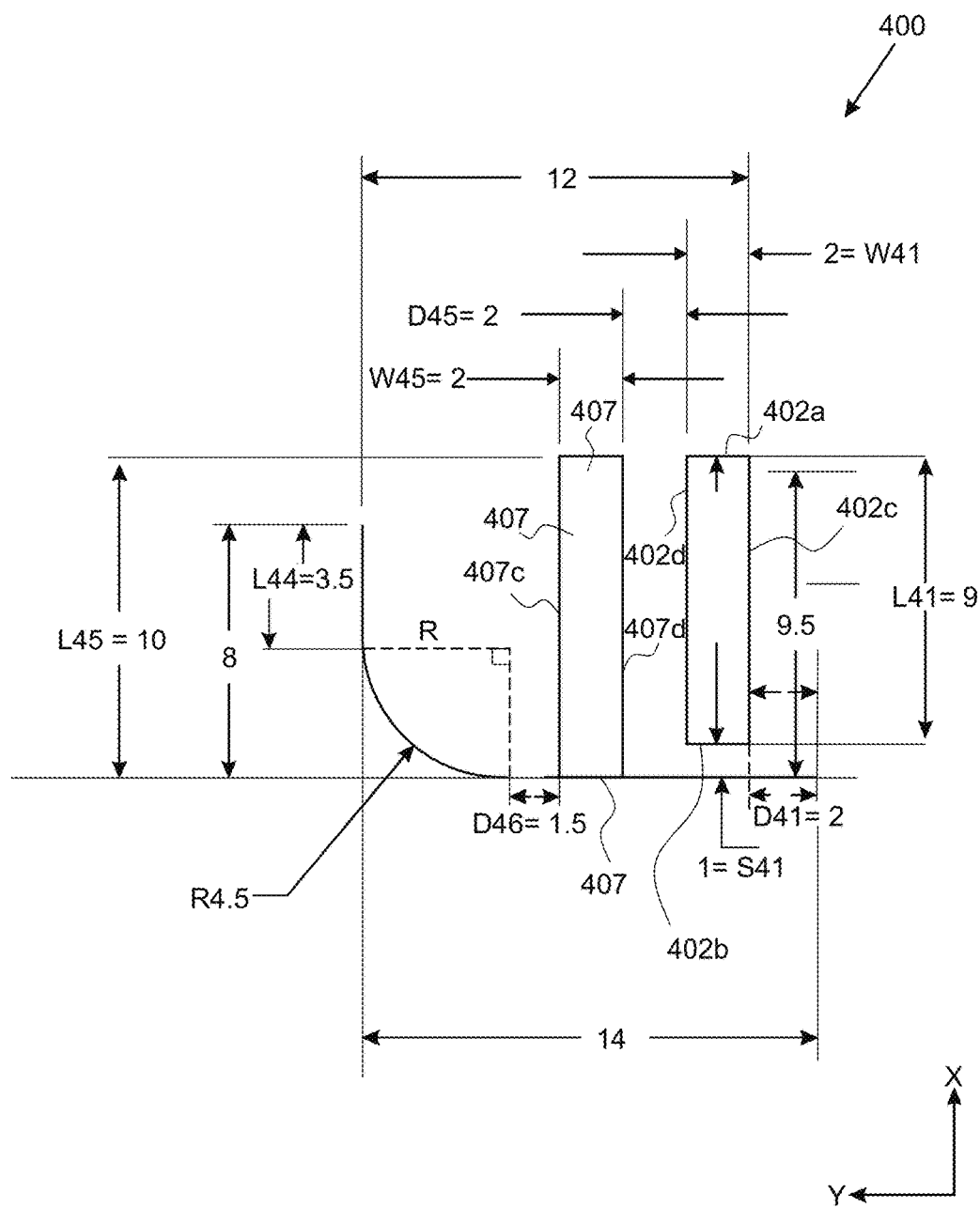
FIG. 11 is a top view of the antenna of FIG. 10.
Figure 12:
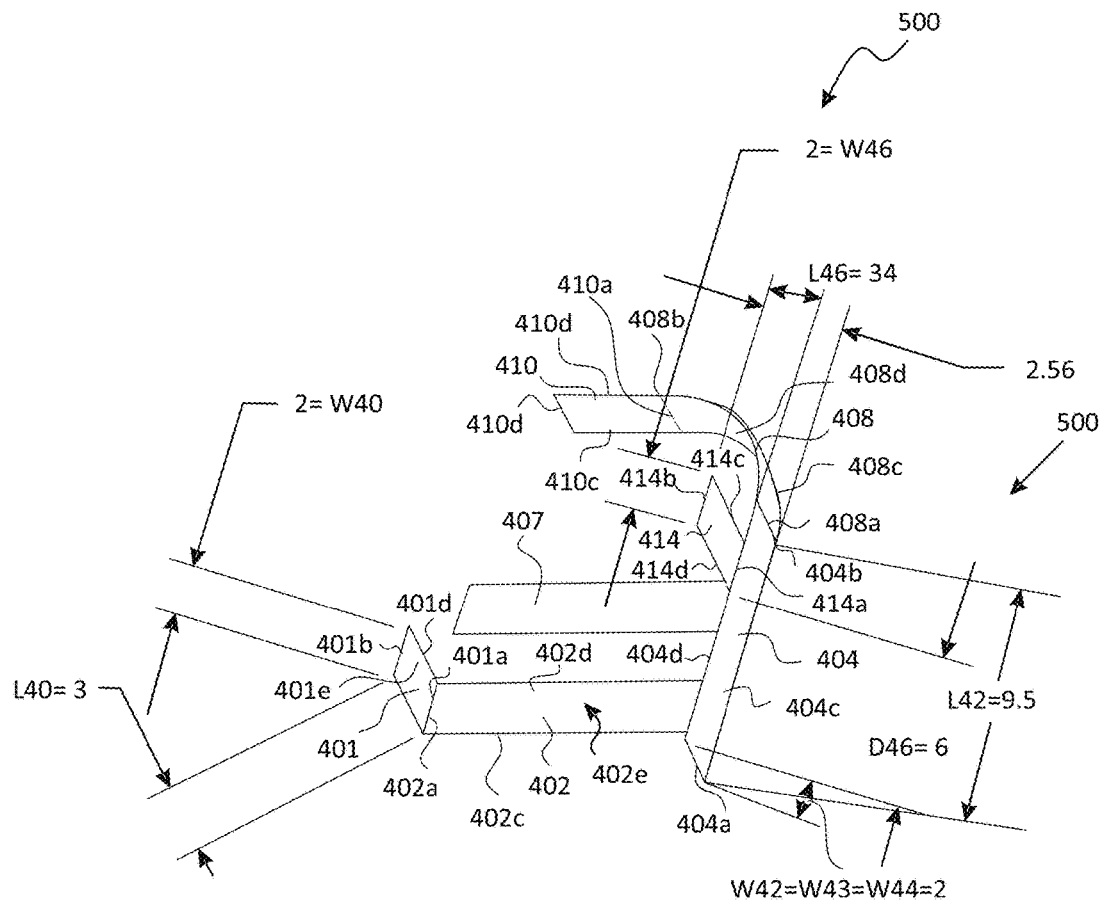
FIG. 12 is a bottom perspective view of the antenna of FIG. 10.

FIGS. 10-12 illustrate an example embodiment of antenna 400. Antenna 400 includes a feeding pin 401, radiating members 402, 404, 407, 408, and 410, and a shorting pin 414. As illustrated in the example of FIGS. 10-12, the feeding pin 401, radiating members 402, 404, 407 and 410, and the shorting pin 414 are each substantially planar rectangular elements. Radiating member 408 is substantially a curved element.

Each of radiating members 402 and 407 has a top surface and a bottom surface. Each of the feeding pin 401, radiating members 404, 408, and 410, and the shorting pin 414, has an inner surface and an outer surface. When antenna 400 is placed on the support member 140, for example, as illustrated in FIGS. 1-3, the top surfaces of radiating members 402 and 407 face the back cover 162 of the housing frame 160, and the bottom surfaces of radiating members 402 and 407 face the screen 170 of the electronic device 10; the inner surfaces of radiating members 404, 408 and 410, and the shorting pin 414 face the outer surface 146 of the support member 140, and the outer surfaces of radiating members 404, 408 and 410, and the shorting pin 414 face an outside of the electronic device 10; the inner surface of feeding pin 401 faces the inside of the electronic device 10, and the outer surface of feeding pin 401 faces inner surface 144 of the support member 140.

The feeding pin 401 has two opposite ends 401a and 401b, and two opposite side edges 401c and 401d (FIG. 12). Referring to the orthogonal X, Y, Z reference coordinate system in FIG. 12, the feeding pin 401 is substantially parallel to the Y-Z plane, and two side edges 401c and 401d are substantially parallel to the Z-axis. The feeding pin 401 has a length L40 between opposite ends 401a and 401b, and a width W40 between opposite side edges 401c and 401d. For example, L40=3 mm and W40=2 mm (FIG. 12).

In some embodiments, as illustrated in FIG. 3, the feeding pin 401 receives RF signals fed to antenna 400 from transceiver circuit 152. Similarly, RF signals received over an air interface by antenna 400 are fed through feeding pin 401 to transceiver 152. In some embodiments, a cable is used to connect the feeding pin 401 of antenna 400 to the transceiver 152 via a signal path 116 on the PCB board 150.

The rectangular radiating member 402 has two opposite ends 402a and 402b, and two opposite side edges 402c and 402d. The radiating members 401 and 402 are perpendicular to each other in two planes. In the example of FIGS. 10-12, the rectangular radiating member 402 is substantially parallel to the X-Y plane, and two side edges 402c and 402d substantially parallel to the X-axis. The rectangular radiating member 402 has a length L41 between opposite ends 402a and 402b, and a width W41 between opposite side edges 402c and 402d. For example, L41=9 mm and W41=2 mm (FIG. 11). The end 401a is electrically connected, for example by a weld, with an end portion of the bottom surface 402e of the radiating member 402 and close to the end 402a.

The rectangular radiating member 404 has two opposite ends 404a and 404b, and two opposite side edges 404c and 404d. The radiating members 402 and 404 are perpendicular to each other in two planes. In the example of FIGS. 10-12, the rectangular radiating member 404 is substantially on the Z-Y plane, and two side edges 404c and 404d are substantially parallel to the Y-axis. The rectangular radiating member 404 has a length L42 between opposite ends 404a and 404b, and a width W42 between opposite side edges 404c and 404d. For example, L42=9.5 mm, W42=2 mm (FIG. 11), and the distance between side edge 402c and the end 404a D41=2 mm (FIG. 11).

A slot 406 is defined between the end 402b and the side edge 404c. Signals to and from the feeding pin 401 are coupled between the rectangular radiating members 402 and 404 via the slot 406. The slot 406 functions as a capacitive element between the rectangular radiating members 402 and 404 such that the slot 406 enables the overall size of the antenna 400 to be smaller with respect to a given bandwidth than the antenna would be without the slot 406. As well, the slot 406 improves impedance match between antenna 400 and transceiver 152. In example embodiments, the slot 406 has a uniform width, for example S41=1 mm (FIG. 11).

The rectangular radiating member 407 has two opposite ends 407a and 407b, and two opposite side edges 407c and 407d. The radiating members 407 and 404 are substantially perpendicular to each other in two planes. In the example of FIGS. 10-12, the rectangular radiating member 407 is substantially on the X-Y plane, and two side edges 407c and 407d are substantially parallel to the X-axis. The rectangular radiating member 407 has a length L45 between opposite ends 407a and 407b, and a width W45 between opposite side edges 407c and 407d. For example, L45=10 mm and W45=2 mm (FIG. 11). Side edges 407d and 402d are substantially parallel to each other. In an example, the distance between side edges 407d and 402d is D45=2 mm (FIG. 11). The end 407a is electrically connected, for example by a weld, with an end portion of the inner surface 404e of rectangular radiating member 404 and close to side edge 404c and the distal end 404b. In an example, the distance between the side edge 407c and the end 404b D46=1.5 mm (FIG. 11).

The curved radiating member 408 has two opposite ends 408a and 408b, and two opposite curved parallel edges 408c and 408d extended between the ends 408a and 408b. In some examples, the curved radiating member 408 substantially is a circular arc having a radius curvature R and a degree of curvature D. For example, R=4.5 mm, D=90° (FIG. 11). The curved radiating member 408 has a width W43 between opposite side edges 408c and 408d, for example, W43=2 mm. The end 404b of radiating member 404 is electrically connected, for example by a weld, with the end 408a of curved radiating member 408.

The rectangular radiating member 410 has two opposite ends 410a and 410b, and two opposite side edges 410c and 410d. Radiating members 410 and 404 are substantially perpendicular to each other in two planes. In the example of FIGS. 10-12, the rectangular radiating member 410 is substantially on the Z-X plane, and two side edges 410c and 410d are substantially parallel to the X-axis. The rectangular radiating member 410 has a length L44 between opposite ends 410a and 410b, and a width W44 between opposite side edges 410c and 410d. For example, L44=3.5 mm (FIG. 11), W44=2 mm (FIG. 12). The end 408b of radiating member 408 is electrically connected, for example by a weld, with the end 410a of radiating member 410.

The shorting pin 414 has two opposite ends 414a and 414b, and two opposite side edges 414c and 414d. The shorting pin 414 and the radiating member 404 are perpendicular to each other in the same plane. In the example of FIGS. 10-12, the shorting pin 414 is substantially on the Z-Y plane, and two side edges 414c and 414d are substantially parallel to the Z-axis. The shorting pin 414 has a length L46 between opposite ends 414a and 414b, and a width W46 between opposite side edges 414c and 414d. For example, L46=3 mm and W46=2 mm (FIG. 12). The end 414a is electrically connected with side edge 404d and close to the distal end 404b. In the example of FIG. 12, the distance between side edges 414d and the end 404a is D46=6 mm.

In some embodiments, antenna 400 is connected to the common ground of the PCB 150 via the shorting pin 414, so that the common ground of PCB 150 provides a grounding plane for antenna 400. For example, the shorting pin 414 connects through a wire with the common ground of the PCB board 150 or connects with the common ground of the PCB board 150 via a spring contact.

With the exemplary dimensions illustrated in FIGS. 10-12, antenna 400 supports an operating frequency range of 3-5 GHz. Structure and dimensions of antenna 400 are determined based on actual arrangements of existing hardware on the bottom portion of the PCB 150 and available space in the electronic device 10. Therefore, antenna 400 can be conveniently implemented in the electronic device 10 to support 5G RATs, for example, a bottom corner portion of the housing 158, without modifying the arrangement of the existing hardware components of electronic device 10.

Structure of antenna 400 may be varied. In an example, two or more of the feeding pin 401, radiating members 402, 404, 407, 408 and 410, and the shorting pin 414 form one radiating member. For example, radiating members 404, 408, and 410 form one radiating member, which is welded with shorting pin 414 and radiating member 407; feeding pin 401 and radiating member 402 form one radiating member.

In another example the feeding pin 401, radiating members 402, 404, 407, 408 and 410, and the shorting pin 214 (collectively, the "elements") are formed from a planar conductive sheet. For example, antenna 400 can be made with the following steps:

1) cut the planar conductive sheet to form the elements based on the structure and dimensions illustrated in FIGS. 10-12;
2) fold feeding pin 401 by ninety degrees with respect to radiating member 402 along the line defined by the end 401a so that the outer surface of feeding pin 401 faces the inner surface 144 of support member 140; and
3) fold radiating members 404, 408 and 410, and the shorting pin 414 by ninety degrees with respect to radiating member 407 along the line defined by the end 407a, and bend radiating member 408 to form a circular curve, so that the inner surface of radiating members 404, 408 and 410 and shorting pin 414 face the outer surface 146 of support member 140.

The order of steps 1)-3) may be varied.

Antenna 500

Figure 13:
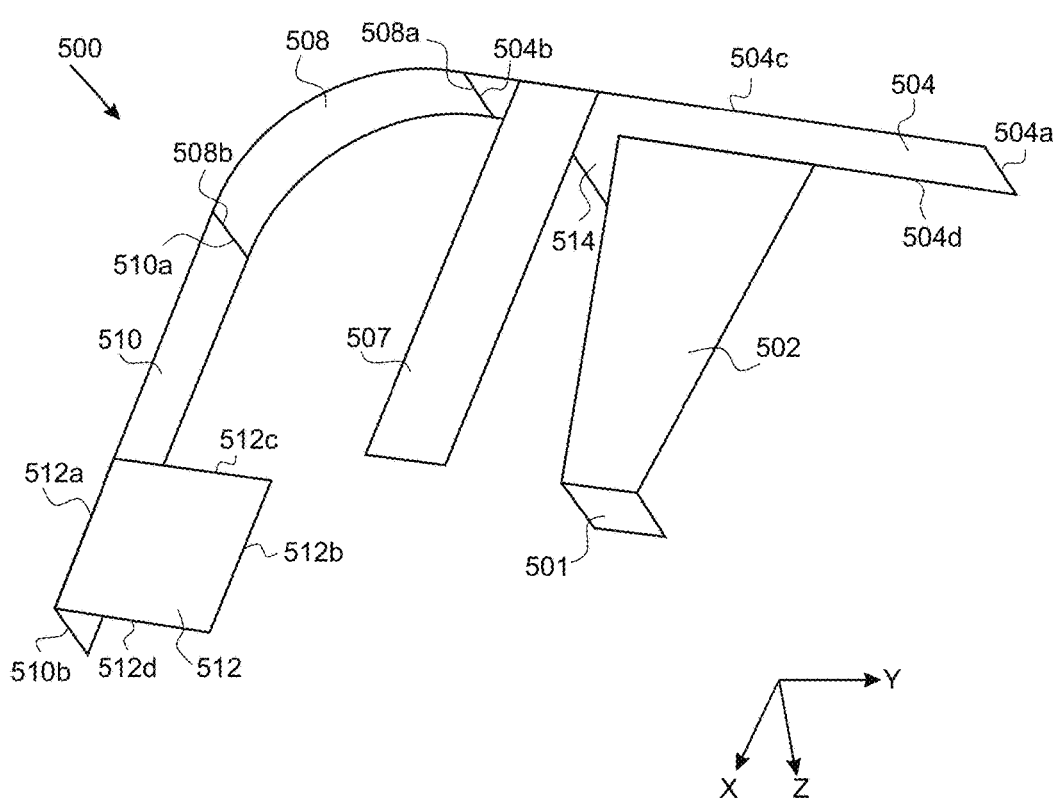
FIG. 13 is a front perspective view of an antenna, according to example embodiments.
Figure 14:
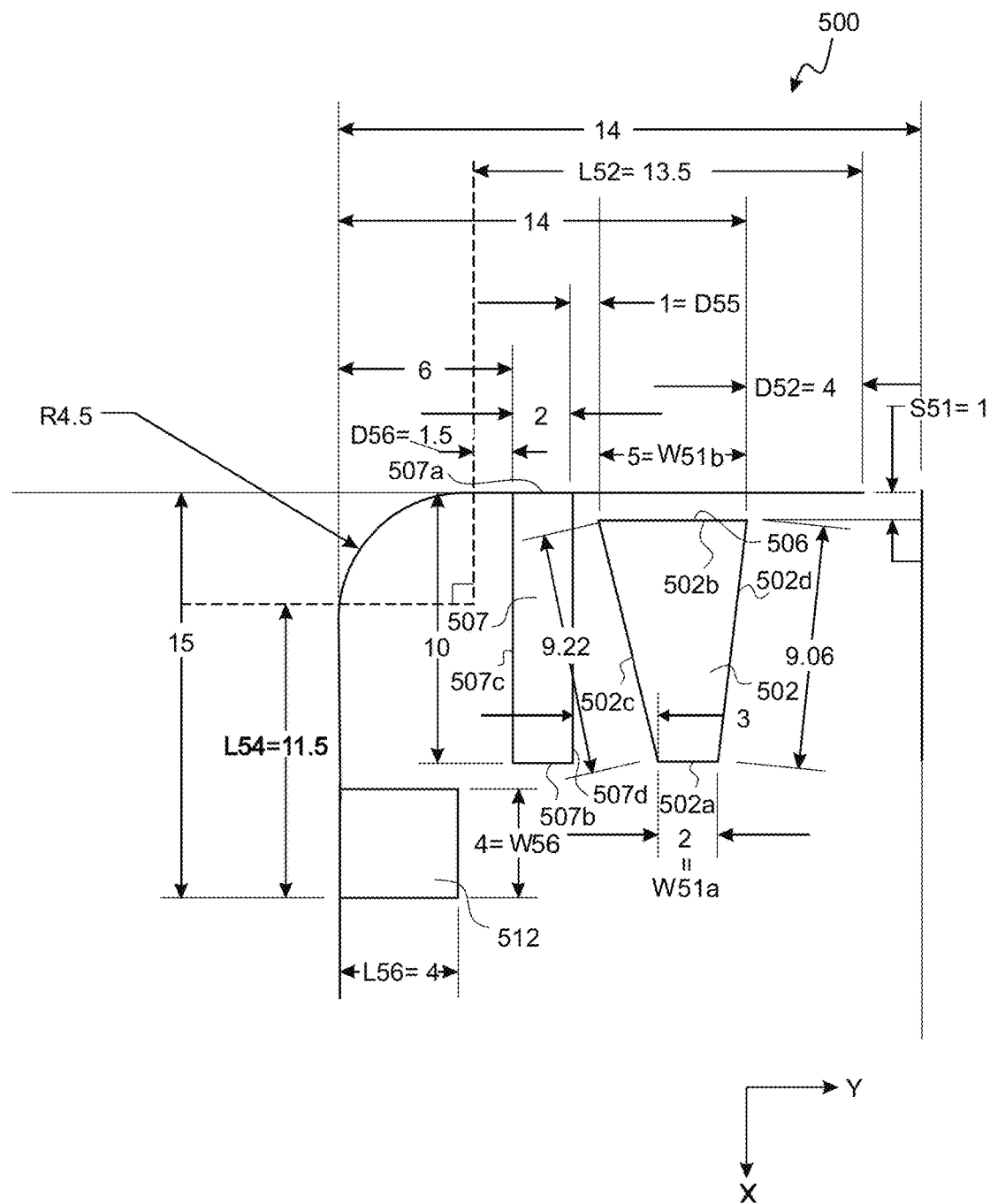
FIG. 14 is a top view of the antenna of FIG. 13.
Figure 15:
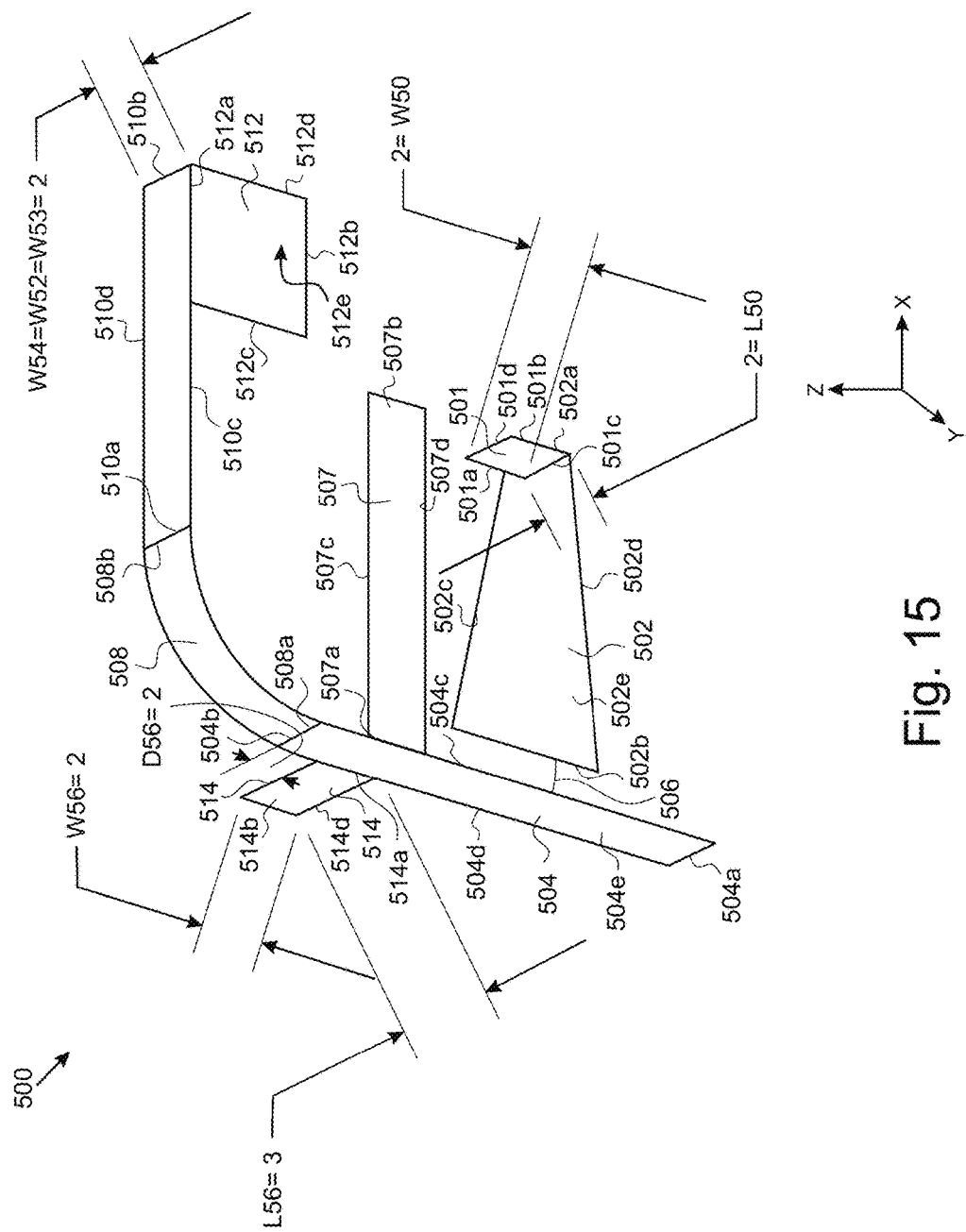
FIG. 15 is a bottom perspective view of the antenna of FIG. 13.

FIGS. 13-15 illustrate an exemplary embodiment of antenna 500. Antenna 500 includes a feeding pin 501, radiating members 502, 504, 507, 508, 510, and 512, and a shorting pin 514. The feeding pin 501, radiating members 504, 507, 510 and 512, and the shorting pin 514 are each substantially planar rectangular elements. Radiating member 502 is substantially a trapezoidal element. Radiating members 508 is substantially a curved element.

Each of radiating members 502, 507 and 512 has a top surface and a bottom surface. Each of the feeding pin 501, radiating members 504, 508, and 510, and the shorting pin 514, has an inner surface and an outer surface. When antenna 500 is placed on the support member 140, for example, as illustrated in FIGS. 1-3, the top surfaces of radiating members 502, 507 and 512 face the back cover 162 of the housing frame 160, and the bottom surfaces of radiating members 502, 507 and 512 face the screen 170 of the electronic device 10; the inner surfaces of radiating members 504, 508, and 510, and the shorting pin 514 face the outer surface 146 of the support member 140, and the outer surfaces of radiating members 504, 508, and 510, and the shorting pin 514 face the outside of the electronic device 10; the inner surface of feeding pin 501 faces the inside of the electronic device 10, and the outer surface of feeding pin 501 faces inner surface 144 of the support member 140.

The feeding pin 501 has two opposite ends 501a and 501b, and two opposite side edges 501c and 501d. Referring to the orthogonal X, Y, Z reference coordinate system in FIGS. 13 and 15, the feeding pin 501 is substantially parallel to the Y-Z plane, and two side edges 501c and 501d are substantially parallel to the Z-axis. The feeding pin 501 has a length L50 between opposite ends 501a and 501b, and a width W50 between opposite side edges 501c and 501d. For example, L50=2 mm and W50=2 mm (FIG. 15).

In some embodiments, as illustrated in FIG. 3, the feeding pin 501 receives RF signals fed to antenna 500 from transceiver circuit 152. Similarly, RF signals received over an air interface by antenna 500 are fed through feeding pin 501 to transceiver 152. In some embodiments, a cable is used to connect the feeding pin 501 of antenna 500 to the transceiver 152 via a signal path 116 on the PCB board 150.

The trapezoidal radiating member 502 has two parallel bases 502a and 502b and two side edges 502c and 502d. The feeding pin 501 and trapezoidal radiating member 502 are perpendicular to each other in two planes. The trapezoidal radiating member 502 is substantially parallel to the X-Y plane. In the example of FIGS. 13 and 15, bases 502a and 502b are substantially parallel to the Y-axis. Bases 502a and 502b have widths W51a and W51b, respectively. Sides 502c and 502d have lengths L51a and L51b, respectively. For example, W51a=2 mm, W51b=5 mm, L51a=9.22 mm, and L51b=9.06 mm (FIG. 14). The end 501b is electrically connected, for example by a weld, with an end portion of a bottom surface 502e of the trapezoidal radiating member 502 and close to the base 502a. The trapezoidal radiating member 502 has a greater overall size than radiating element 402 due to the specific arrangement of existing hardware close to antenna 500. The greater overall size of radiating element 502 helps improve the bandwidth of antenna 500.

The rectangular radiating member 504 has two opposite ends 504a and 504b, and two opposite side edges 504c and 504d. The radiating members 502 and 504 are perpendicular to each other in two planes. In the example of FIGS. 13 and 15, the rectangular radiating member 504 is substantially parallel to the Z-Y plane, and two side edges 504c and 504d are substantially parallel to the Y-axis. The rectangular radiating member 504 has a length L52 between opposite ends 504a and 504b, and a width W52 between opposite side edges 504c and 504d. For example, L52=13.5 mm, W52=2 mm (FIG. 15), and the distance between the end 504a and the corner of sided edge 504d and the base 502b D52=4 mm (FIG. 14).

A slot 506 is defined between the base 502b and the side edge 504c. Signals to and from the feeding pin 501 are coupled between the trapezoidal radiating member 502 and rectangular radiating member 504 via the slot 506. The slot 506 functions as a capacitive element between the trapezoidal radiating members 502 and rectangular radiating member 504 such that the slot 506 enables the overall size of the antenna 500 to be smaller with respect to a given bandwidth than the antenna would be without the slot 506. As well, the slot 506 helps improve impedance match between antenna 500 and transceiver 152. In example embodiments, the slot 506 has a uniform width, for example S51=1 mm.

The rectangular radiating member 507 has two opposite ends 507a and 507b, and two opposite side edges 507c and 507d. The radiating members 507 and 504 are substantially perpendicular to each other in two planes. In the example of FIGS. 13 and 15, the rectangular radiating member 507 is substantially parallel to the X-Y plane, and two side edges 507c and 507d are substantially parallel to the X-axis. The rectangular radiating member 507 has a length L55 between opposite ends 507a and 507b, and a width W55 between opposite side edges 507c and 507d. For example, L55=10 mm and W45=2 mm, and the distance between side edge 507d and the corner of base 502b and side edge 502c is D55=1 mm (FIG. 14). The end 507a is electrically connected, for example by a weld, with an end portion of an inner surface 504e of rectangular radiating member 504 and close to side edge 504d and the distal end 504b. For example, the distance between the side edge 507c and the end 504b is D56=1.5 mm (FIG. 14).

The curved radiating member 508 has two opposite ends 508a and 508b, and two opposite curved parallel edges 508c and 508d extended between the ends 504b and 508a. In some examples, the bended radiating member 508 is substantially a circular arc having radius curvature R and a degree of curvature D. For example, R=4.5 mm, D=90°. The curved radiating member 508 has a width W53 between opposite side edges 508c and 508d, for example, W53=2 mm (FIG. 15). The end 504b electrically connected, for example by a weld, with the end 508a of the curved radiating member 508.

The rectangular radiating member 510 has two opposite ends 510a and 510b, and two opposite side edges 510c and 510d. Radiating members 510 and 504 are substantially perpendicular to each other in two planes. In the example of FIGS. 13 and 15, the rectangular radiating member 510 is substantially parallel to the Z-X plane, and two side edges 510c and 510d are substantially parallel to the X-axis. The rectangular radiating member 510 has a length L54 between opposite ends 510a and 510b, and a width W54 between opposite side edges 510c and 510d. For example, L54=11.5 mm, W54=2 mm (FIG. 14). The end 508b of radiating member 508 is electrically connected, for example by a weld, with the end 510a of radiating member 510.

The rectangular radiating member 512 has two opposite ends 512a and 512b, and two opposite side edges 512c and 512d. The radiating members 512 and 510 are substantially perpendicular to each other in two planes. In the example of FIGS. 13 and 15, the rectangular radiating member 512 is substantially parallel to the X-Y plane and two side edges 512*c* and 512*d* are substantially parallel to the Y-axis. The rectangular radiating member 512 has a length L56 between opposite ends 512*a* and 512*b*, and a width W56 between opposite side edges 512*c* and 514*d*. For example, L56=4 mm and W56=4 mm (FIG. 14). A section of side edge 510*c* close to the distal end 510*b* is electrically connected, for example by a weld, with an end portion of a bottom surface 512*e* of radiating member 512 close to the end 512*a*. Compared with antenna 400, antenna 500 includes radiating element 512 to compensate the electromagnetic effect caused by the existing hardware close to antenna 500 in electronic device 10.

The shorting pin 514 has two opposite ends 514*a* and 514*b*, and two opposite side edges 514*c* and 514*d*. The shorting pin 514 and the radiating member 504 are perpendicular to each other in the same plane. In the example of FIGS. 13 and 15, the shorting pin 514 is substantially parallel to the Z-Y plane, and two side edges 514*c* and 514*d* are substantially parallel to the Z-axis. The shorting pin 514 has a length L56 between opposite ends 514*a* and 514*b*, and a width W46 between opposite side edges 514*c* and 514*d*. For example, L56=3 mm and W56=2 mm. The end 514*a* is electrically connected, for example by a weld, with side edge 504*d* and close to the distal end 504*b*. In an example, the distance between side edges 514*c* and the end 504*b* is D56=2 mm (FIG. 14).

In some embodiments, the antenna 500 is connected to the common ground of the PCB 150 via the shorting pin 514, so that the common ground of PCB 150 provides a grounding plane for antenna 500. For example, the shorting pin 514 connects through a wire with the common ground of the PCB board 150 or connects with the common ground of the PCB board 150 via a spring contact.

With the exemplary dimensions illustrated in FIGS. 13-15, antenna 500 supports an operating frequency range of 3-5 GHz. Structure and dimensions of antenna 500 are determined based on actual arrangements of the existing hardware on the top portion of the PCB 150 and available space in the electronic device 10. Therefore, antenna 500 can be conveniently implemented in the electronic device 10 to support 5G RATs, for example, a top corner portion of the housing 158, without modifying the arrangement of the existing hardware components of electronic device 10.

Structure of antenna 500 may be varied. In an example, two or more of the feeding pin 501, radiating members 502, 504, 507, 508, 510, and 512, and the shorting pin 514 form one radiating member. For example, radiating members 504, 508, 510 and 512 form one radiating member, which is welded with shorting pin 514 and radiating member 407; feeding pin 501 and radiating member 502 form one radiating member.

In another example, the feeding pin 501, radiating members 502, 504, 507, 508, 510, and 512, and the shorting pin 514 (collectively, the "elements") are formed from a planar conductive sheet. For example, antenna 500 can be made with the following steps:
1) cut the planar conductive sheet to form the elements based on the structure and dimensions illustrated in FIGS. 13-15;
2) fold feeding pin 501 by ninety degrees with respect to radiating member 502 along the line defined by the end 502*a* so that the outer surface of feeding pin 501 faces the inner surface 144 of support member 140;
3) fold radiating members 504, 508, 510, and 512, and the shorting pin 514 by ninety degrees with respect to radiating member 507 along the line defined by the end 507*a*, and bend radiating member 508 to form a circular curve, so that the inner surface of radiating members 504, 508, and 510 and the shorting pin 514 face the outer surface 146 of support member 140; and
4) fold radiating member 512 by ninety degrees with respect to radiating member 510 along the line defined by the end 512*a* so that the bottom surface of radiating member 512 faces the back surface 142 of support member 140.

The order of steps 1)-4) may be varied.

Antenna 600

Figure 16:
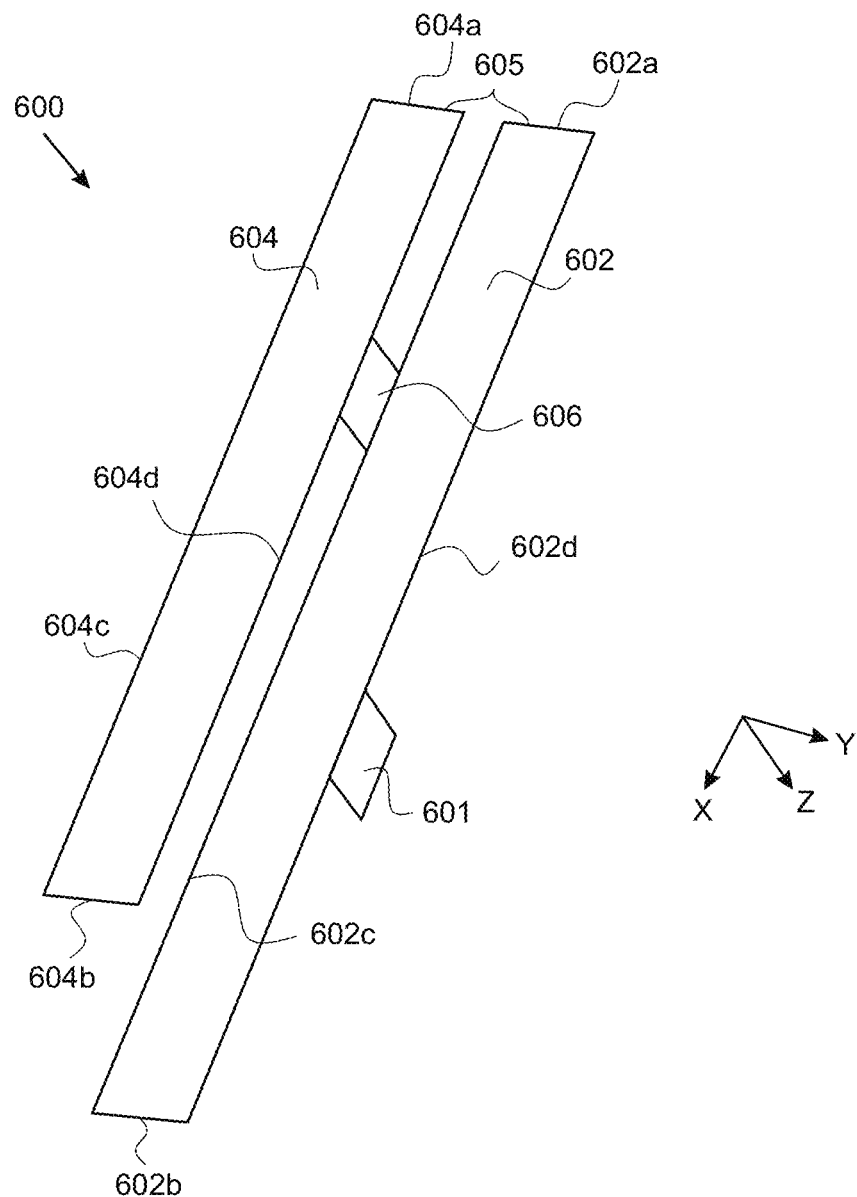
FIG. 16 is a front perspective view of an antenna, according to example embodiments.
Figure 17:
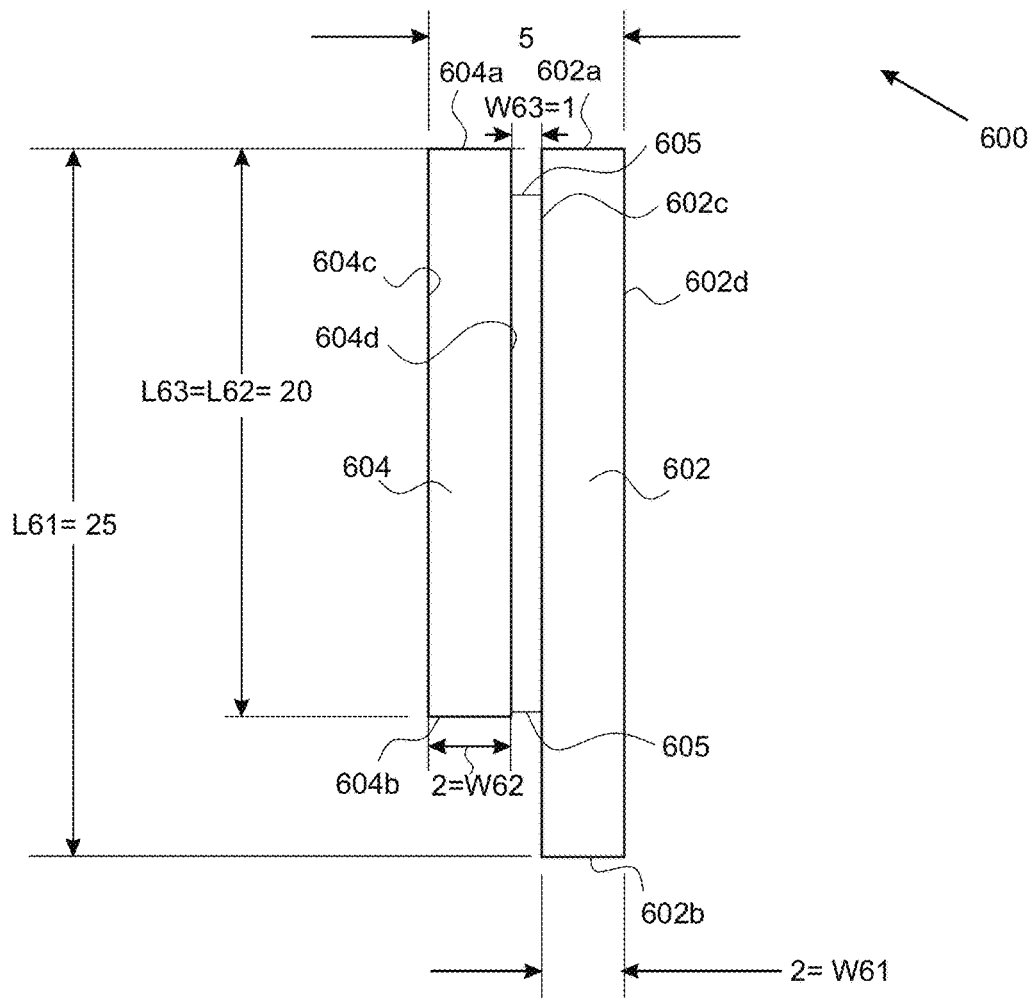
FIG. 17 is a top view of the antenna of FIG. 16.
Figure 18:
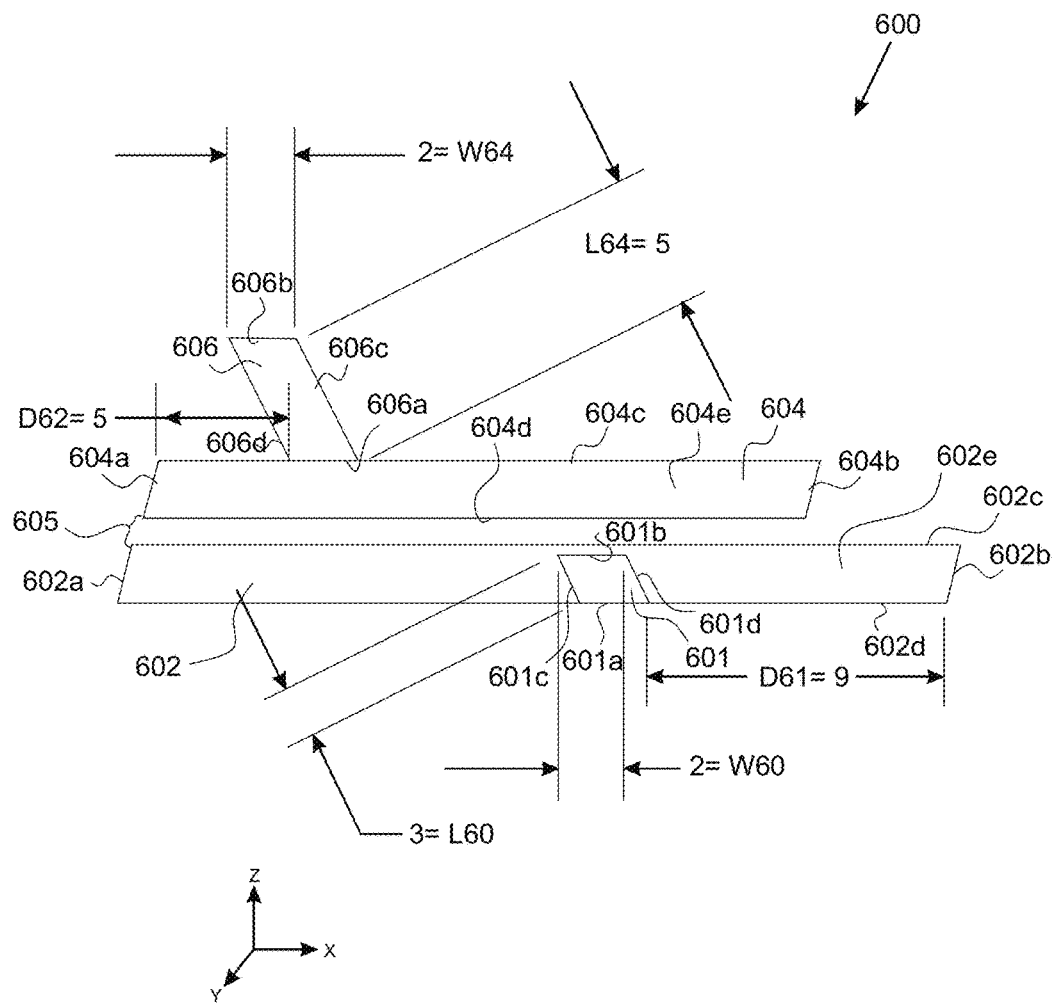
FIG. 18 is a bottom perspective view of the antenna of FIG. 16.

FIGS. 16-18 illustrate an example embodiment of antenna. Antenna 600 includes a feeding pin 601, radiating members 602 and 604, and a shorting pin 606. As illustrated in the example of FIGS. 16-18, the feeding pin 601, radiating members 602 and 604, and a shorting pin 606 are each substantially planar rectangular elements.

Each of radiating members 602 and 604 has a top surface and a bottom surface. Each of the feeding pin 601 and the shorting pin 606 has an inner surface and an outer surface. When antenna 600 is placed on the support member 140, for example, as illustrated in FIGS. 1-3, the top surfaces of radiating members 602 and 604 face the back cover 162 of the housing frame 160, and the bottom surfaces of radiating members 602 and 604 face the screen 170 of the electronic device 10; the inner surface of the shorting pin 606 faces the outer surface 146 of the support member 140, and the outer surface of the shorting pin 606 faces the outside of the electronic device 10; the inner surface of feeding pin 601 faces the inside of the electronic device 10, and the outer surface of feeding pin 601 faces inner surface 144 of the support member 140.

The feeding pin 601 has two opposite ends 601*a* and 601*b*, and two opposite side edges 601*c* and 601*d*. Referring to the orthogonal X, Y, Z reference coordinate system in FIGS. 16 and 18, the feeding pin 601 is substantially parallel to the X-Z plane, and two side edges 601*c* and 601*d* are substantially parallel to the Z-axis. The feeding pin 601 has a length L60 between opposite ends 601*a* and 601*b*, and a width W60 between opposite side edges 601*c* and 601*d*. For example, L60=3 mm and W60=2 mm (FIG. 18).

In some embodiments, as illustrated in FIG. 3, the feeding pin 601 receives RF signals fed to antenna 600 from transceiver circuit 152. Similarly, RF signals received over an air interface by antenna 600 are fed through feeding pin 601 to transceiver 152. In some embodiments, a cable is used to connect the feeding pin 601 of antenna 600 to the transceiver 152 via a signal path 116 on the PCB board 150.

The rectangular radiating member 602 has two opposite ends 602*a* and 602*b*, and two opposite side edges 602*c* and 602*d*. The radiating member 602 and the feeding pin 601 are substantially perpendicular to each other in two planes. In the example of FIGS. 16 and 18, the rectangular radiating member 602 is substantially parallel to the X-Y plane, and the two side edges 602*c* and 602*d* are substantially parallel to the X-axis. The rectangular radiating member 602 has a length L61 between opposite ends 602*a* and 602*b*, and a width W61 between opposite side edges 602*c* and 602*d*. For example, L61=25 mm and W61=2 mm (FIG. 17). The end 601*a* is electrically connected, for example by a weld, with a bottom surface 602*e* of radiating member 602 close to the side edge 602*d*. The distance between the side edge 601*d* and the end 602*b* is D61, for example, D61=9 mm (FIG. 18).

The rectangular radiating member 604 has two opposite ends 604*a* and 604*b*, and two opposite side edges 604*c* and 604*d*. The radiating members 604 and 602 are substantially parallel to each other in the same plane. The rectangular radiating member 604 is shorter than rectangular radiating member 602. The end 604a is substantially aligned with the end 602a. In the example of FIGS. 16 and 18, the rectangular radiating member 604 is substantially parallel to the X-Y plane, and two side edges 604c and 604d are substantially parallel to the X-axis. The rectangular radiating member 604 has a length L62 between opposite ends 604a and 604b, and a width W62 between opposite side edges 604c and 604d. For example, L62=20 mm and W62=2 mm (FIG. 17).

The side edge 604d and a corresponding section of the side edge 602c define a slot 605. The length of the slot is L63 and the width of the slot is W63. For example, W63=1 mm (FIG. 17), and L63=L62=20 mm (FIG. 18). The width of the slot 605 may be selected to provide a desired capacitive effect. Signals to and from the feeding pin 601 are coupled between radiating member 602 and the radiating member 604 via the slot 605. The slot 605 provides a capacitive element between the radiating member 602 and the radiating member 604 such that the slot 605 enables the overall size of the antenna 600 to be smaller with respect to a given bandwidth than the antenna would be without the slot 605. As well, the slot 605 improves impedance match between antenna 600 and transceiver 152.

The shorting pin 606 has two opposite ends 606a and 606b, and two opposite side edges 606c and 606d. The shorting pin 606 and the radiating member 604 are substantially perpendicular to each other in two planes. In the example of FIGS. 16 and 18, the shorting pin 606 is substantially parallel to the X-Z plane and the two side edges 606c and 606d are substantially parallel to the Z-axis. The shorting pin 606 has a length L64 between opposite ends 606a and 606b, and a width W64 between opposite side edges 606c and 606d. For example, L64=5 mm and W64=2 mm (FIG. 18). The end 606a is electrically connected, for example by a weld, with a bottom surface 604e of radiating member 604 and close to the side edge 604c. The distance between the side edge 606d and the end 604a is D62, for example, D62=5 mm (FIG. 18).

In some embodiments, antenna 600 is connected to the common ground of the PCB 150 via the shorting pin 606, so that the common ground of PCB 150 provides a grounding plane for antenna 600. For example, the shorting pin 606 connects through a wire with the common ground of the PCB board 150 or connects with the common ground of the PCB board 150 via a spring contact.

With the exemplary dimensions illustrated in FIGS. 16-18, antenna 600 supports an operating frequency range of 3-5 GHz. Structure and dimensions of antenna 600 are determined based on actual arrangements of the existing hardware of the PCB 150 and available space in the electronic device 10. Therefore, antenna 600 can be conveniently implemented in the electronic device 10 to support 5G RATs, for example, a side portion of the housing 158, without modifying the arrangement of the existing hardware components of electronic device 10.

Structure of antenna 600 may be varied. For example, feeding pin 601 and radiating member 602 form one radiating member; shorting pin 606 and radiating member 604 form another radiating member.

In another example, the feeding pin 601, radiating members 602 and 604, and the shorting pin 606 (collectively, the "elements") are formed from a planar conductive sheet. For example, antenna 600 can be made with the following steps:

1) cut the planar conductive sheet to form the elements based on the structure and dimensions illustrated in FIGS. 16-18;

2) fold feeding pin 601 by ninety degrees with respect to radiating member 602 along the line defined by the end 601a so that the outer surface of feeding pin 601 faces the inner surface 144 of support member 140; and 3) fold shorting pin 606 by ninety degrees with respect to radiating member 604 along the line defined by the end 606a so that the inner surface of shorting pin 606 faces the outer surface 146 of support member 140.

The order of steps 1)-3) may be varied.

Performance of Antennas 200, 300, 400, 500, and 600

In at least some applications, measured results have indicated that antennas 200, 300, 400, 500, and 600 with exemplary dimensions illustrated in FIGS. 4-18 have broad bandwidth, high efficiency, low correlation, and good impedance matching with the output impedance of the transceiver 152 of the electronic device 10.

Figure 19:
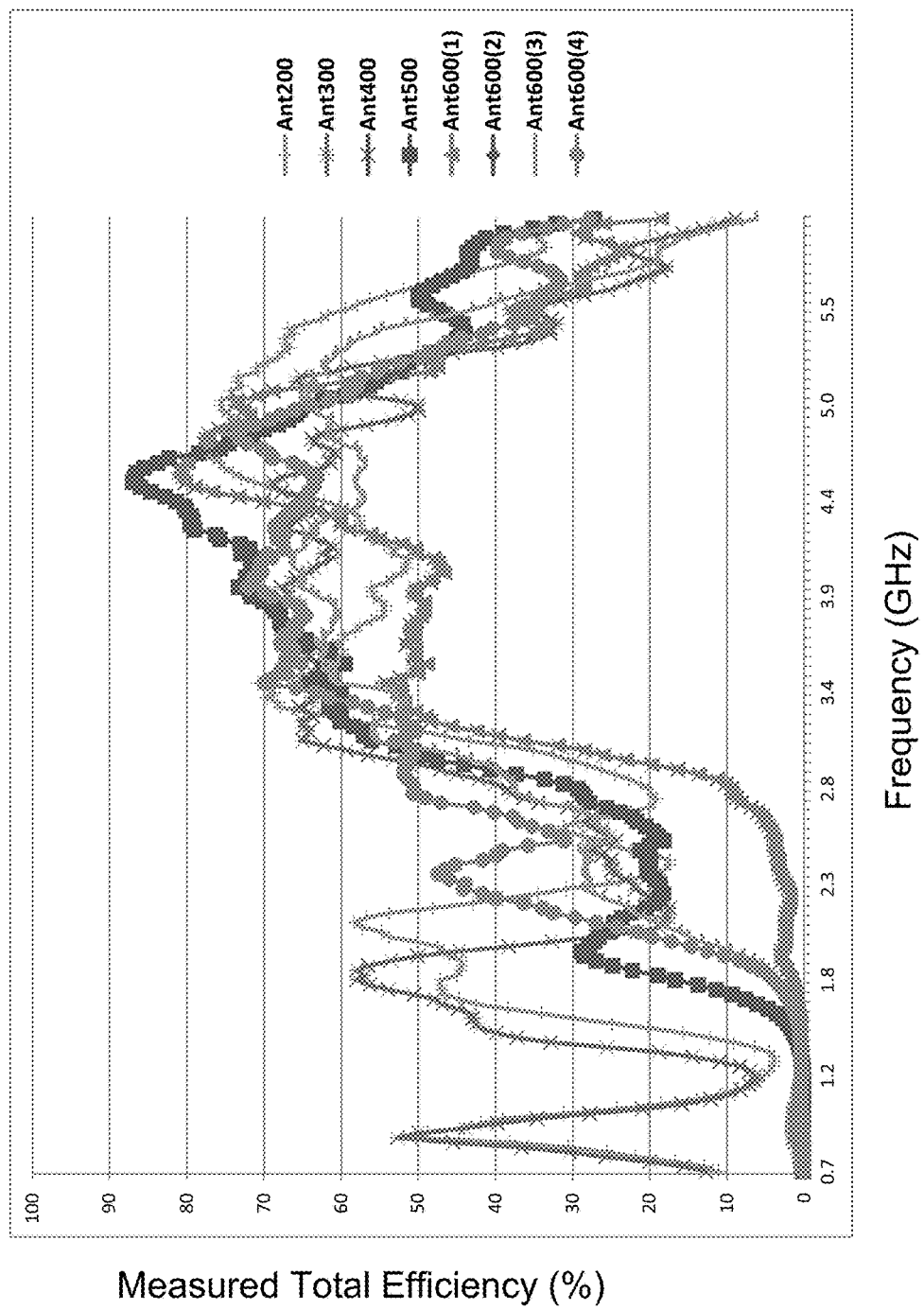
FIG. 19 is a schematic view of the measure total efficiency of the antennas of FIGS. 4-18.

According to measured results in FIG. 19, when the battery 154 is included in electronic device 10, each of antennas 200, 300, 400, 500, and 600 has a total efficiency above 60% in the frequency range from 3 GHz to 5 GHz (5G RAT frequency band); each of antennas 200 and 300 has a total efficiency above 50% in the frequency ranges of 700-960 MHz and 1700-2100 MHz (2G, 3G, and 4G RAT frequency bands).

Figure 20:
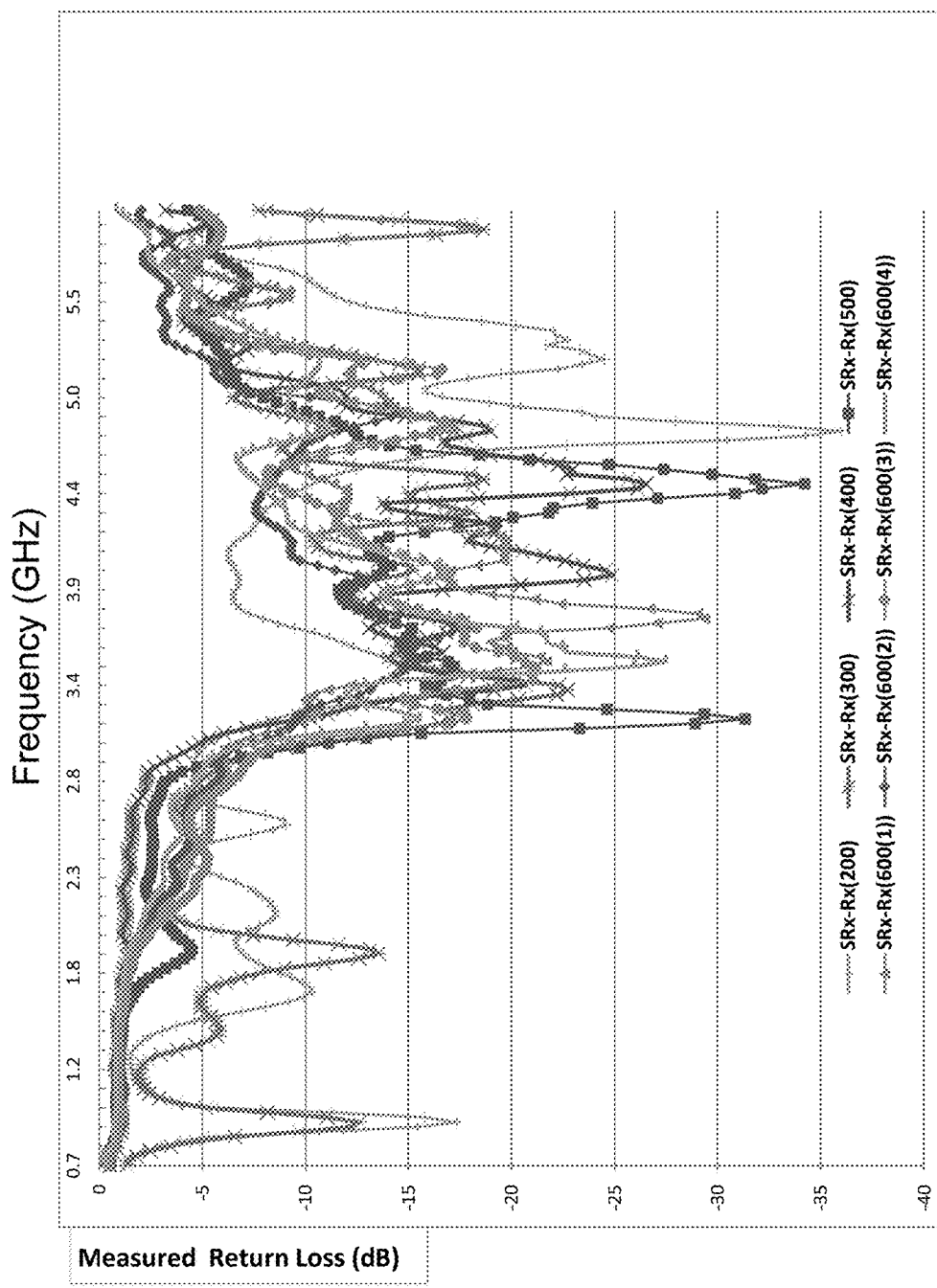
FIG. 20 is a schematic view of the measure return loss of the antennas of FIGS. 4-18.

According to measured results in FIG. 20, each of antennas 200, 300, 400, 500, and 600 has a scattering parameter $S_{Rx\text{-}Rx}$, or a measured antenna return loss, equal or substantially less than −10 dB from 3 GHz to 5 GHz, and each of antennas 200 and 300 also has a scattering parameter $S_{Rx\text{-}Rx}$ equal or substantially less than −7 dB in 700-960 MHz and 1700-2100 MHz frequency ranges.

In other words, each of antennas 200 and 300 has operating frequency ranges of 700-960 MHz, 1700-2100 MHz, and 3 GHz-5 GHz, and each of antennas 400, 500 and 600 has an operating frequency range of 3 GHz-5 GHz. The term "an operating frequency range" of an antenna means that the antenna is capable of transmitting and receiving RF signals within the frequency range with desired performance. For example, each of antennas 200 and 300 is capable of receiving and transmitting RF signals having frequency ranges of 700-960 MHz, 1700-2100 MHz, and 3 GHz-5 GHz, and each of antennas 400, 500 and 600 is capable of receiving and transmitting RF signals having frequency range of 3 GHz-5 GHz. Additionally, within the operating frequency ranges, the total efficiency of each of antennas 200, 300, 400, 500, and 600 is above a predetermined threshold, such as 50%, and the scattering parameter $S_{Rx\text{-}Rx}$ of each of antennas 200, 300, 400, 500, and 600 is equal or substantially less than a predetermined threshold, such as −7 dB.

As well, in some applications, antennas 400, 500, and 600 are compatible with previous 2G, 3G, and 4G UE antenna technologies.

Exemplary 8×8 MIMO Antenna Array—Antennas 200, 300, 400, 500, and 600

An exemplary 8×8 MIMO antenna array is illustrated in FIGS. 1-3. The 8×8 MIMO antenna array includes eight antennas 200, 300, 400, 500 and 600(1)-600(4), which are supported by and secured to the support member 140 in the housing 158, for example by copper glue. The 8×8 MIMO antenna array has a total length L9 and a total width of W9, in the Example of FIG. 21, L9=155 m, W9=78 mm.

As illustrated in FIGS. 1-2, antenna 200 is placed on the back surface 142 of the top portion 140a of the support member 140, and antenna 500 is placed on the back surface 142 of the top left corner defined by the top portion 140a and the side portion 140d of the support member 140. The feeding pin 201 and the shorting pin 214 of antenna 200, and the feeding pin 501 of antenna 500 are placed close to or on the inner surface 144 defined by the top portion 140a of the support member 140. Shorting pin 514 of antenna 500 is placed close to or on the outer surface 146 defined by the top portion 140a of the support member 140. In some examples, the distance between the outer surface 203e of radiating member 203 of antenna 200 and the outer surface 146 defined by the side portion 140c is D90, for example in FIG. 21, D90=5 mm; the distance between the end 504a of radiating member 504 of antenna 500 and side edge 210c of the radiating member 210 of antenna 200 is D91, for example in FIG. 21, D91=2 mm.

Antenna 300 is placed on the back surface 142 of the bottom portion 140b of the support member 140, and antenna 400 is placed on the back surface 142 of the bottom left corner defined by the bottom portion 140b and the side portion 140d of the support member 140. As illustrated in FIGS. 1-2, the feeding pin 301 and the shorting pin 316 of antenna 300, and the feeding pin 401 of antenna 400 are placed close to or on the inner surface 144 defined by the bottom portion 140b of the support member 140. Shorting pin 414 of antenna 400 is placed close to or on the outer surface 146 defined by the bottom portion 140b of the support member 140. In some examples, the distance between the outer surface 303e (FIG. 7) of radiating member 303 of antenna 300 and the outer surface 146 defined by the side portion 140c is D92, for example in FIG. 21, D92=5 mm; the distance between the end 404a of radiating member 404 of antenna 400 and side edge 312c of the radiating member 312 of antenna 300 is D93, for example in FIG. 21, D93=3 mm.

Antennas 600(1)-600(2) are placed on the back surface 142 defined by the side portion 140d. Antennas 600(3)-600(4) are placed on the back surface 142 defined by the side portion 140c. As illustrated in FIGS. 1-2, the feeding pin 601 of each of the antennas 600(1)-600(4) is placed close to or on the inner surface 144 defined by corresponding side portions 140c and 140d of the support member 140. Shorting pin 606 of each of the antennas 600(1)-600(4) is placed close to or on the outer surface 146 defined by the corresponding side portions 140c and 140d of the support member 140. In an example in FIG. 1, 600(1)-600(2) are symmetrical to antennas 600(3)-600(4) with respect to a longitudinal central axis a-a (i.e. the major axis) of the housing 158, and 600(1) and 600(3) are symmetrical to antennas 600(2) and 600(4) with respect to a latitudinal central axis b-b (i.e. the minor axis) of the housing 158. The distance between the line defined by the end 602a and 604a of the antenna 600(1) and 600(3) and the outer surface 146 defined by the bottom portion 140b of the support member 140 is D94, for example in FIG. 21, D94=30 mm; the distance between the line defined by the end 602a and 604a of the antenna 600(2) and 600(4) and the outer surface 146 defined by the top portion 140b of the support member 140 is D95, for example in FIG. 21, D95=30 mm. The distance between the ends 602b of antenna 600(1) and 600(2) and of antenna 600(3) and 600(4) is D96, for example, in FIG. 21, D96=45 mm.

Figure 21:
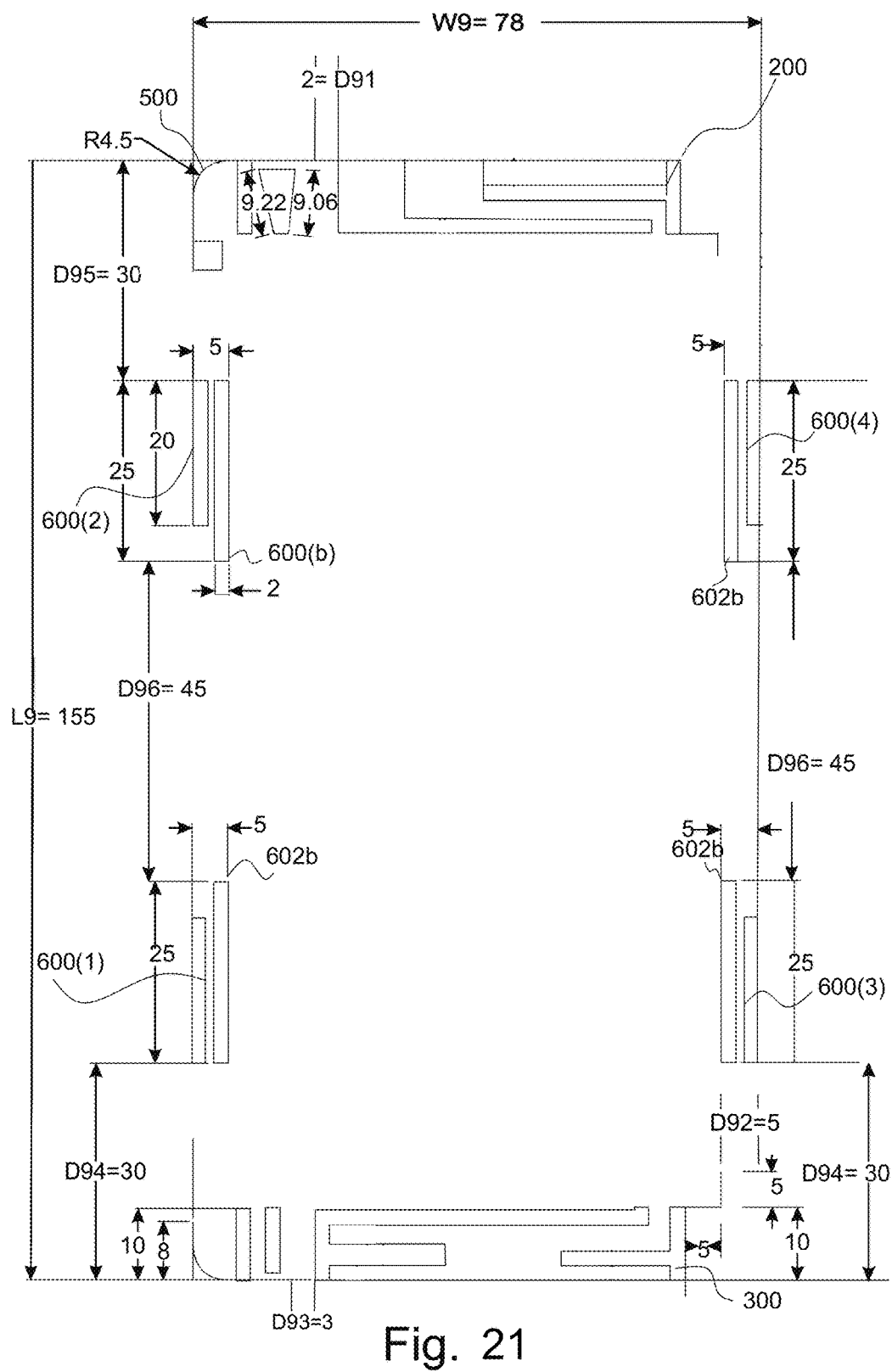
FIG. 21 is a top view of the array of eight antennas, showing relative positions of the eight antennas in FIG. 1.

In the example of FIGS. 1-2 and 21, the aligned ends 602a and 604a of antennas 600(1) and 600(3) are pointed toward the bottom portion 140b of the support member 140, and the aligned ends 602a and 604a of antennas 600(2) and 600(4) are pointed toward the top portion 140a of the support member 140. In some examples, the aligned ends 602a and 604a of at least one of antennas 600(1) and 600(3) are pointed toward the top portion 140b of the support member 140, or the aligned ends 602a and 604a of at least one of antennas 600(2) and 600(4) are pointed toward the bottom portion 140b of the support member 140.

Each of the antennas 200, 300, 400, 500 and 600(1)-600(4) is electrically connected to the transceiver 152 on the PCB 150. For example, each antenna 200, 300, 400, 500 and 600(1)-600(4) may be connected to transceiver 152 by a separate signal trace 116, allowing incoming and outgoing signals for all eight antennas in the MIMO antenna array to be individually processed. Battery 154 supplies power to PCB 150 and transceiver 152. With the distances D91, D92, D93, D94, D95 and D96 illustrated in FIG. 21, a mutual coupling level between any two antennas of the 8×8 MIMO antenna array does not exceed −12 dB from 700-960 MHz and 1700-2100 MHz, and 3 GHz to 5 GHz. The distances D91, D92, D93, D94, D95 and D96 illustrated in FIG. 21 may be varied as long as any coupling between any two antennas of 200, 300, 400, 500 and 600(1)-600(4) below a threshold level. Additionally, in example embodiments the antennas 200, 300, 400, 500 and 600(1)-600(4) are positioned and configured in FIG. 21, the measured Rx-Rx Envelope Correlation Coefficient between different antennas pairs is below 0.2 from 3 GHz to 6 GHz.

By placing antennas 200, 300, 400, 500 and 600(1)-600(4) at the positions illustrated in FIGS. 1-2 based on the actual arrangement of the existing hardware and available free space in the housing 158 of electronic device 10, the 8×8 MIMO antenna array can, in at least some configurations, be introduced in electronic device 10 without interfering or modifying the existing arrangement of the hardware components of electronic device 10.

Additionally, an electronic device having a 8×8 MIMO antenna array typically includes at least 10 antennas: two separate antennas to support 2G, 3G and 4G RATs, such as the main antenna and diversity antenna (typically, antennas for 2G-4G RATs are placed in the top and bottom portions of the electronic device), and eight additional antennas to support 5G RATs. As discussed above, antennas 200 and 300 allows the electronic device 10 to support 2G, 3G, 4G and 5G RATs at the same time. Therefore, antennas 200 and 300 can replace the two separate antennas to support 2G, 3G and 4G RATs. Accordingly, the electronic device 10 with the 8×8 MIMO antenna array illustrated in FIGS. 1-3 and 21 only needs 8 antennas to support 2G, 3G, 4G and 5G RATs at the same time. As such, the 8×8 MIMO antenna array illustrated in FIGS. 1-3 and 21 occupies less free space within the housing 158 and thus is more flexible to implement in electronic device 10.

Performance of the Exemplary 8×8 MIMO Antenna Array

In at least some configurations, the exemplary 8×8 MIMO antenna array described above supports previous 2G, 3G, 4G RATs, and provides broad bandwidth from 3-5 GHz, high efficiency, and low correlation.

In some examples, the 8×8 MIMO antenna array such as those shown in FIGS. 1-3 and 21 has a low correlation between different antennas. For example, according to measured simulation results, the Rx-Rx Envelope Correlation Coefficient between different antennas is substantially below 0.2 from 3 GHz to 5 GHz. As well, the measured results indicated a measured mutual coupling between any two antennas is below −12 dB from 700 MHz-960 MHz, 1700 MHz-2100 MHz and 3 GHz to 5 GHz. Because of the low correlation and low mutual coupling between different antennas, each of the antennas can function independently from the others, and this in turn improves wireless channel capacity represented by each of antennas 200, 300, 400, 500 and 600(1)-600(4).

The exemplary 8×8 MIMO antenna array has high efficiency in some configurations. According to measured results illustrated in the example of FIG. 19, with the battery 154 included in electronic device 10, the 8×8 MIMO antenna array has a total efficiency above 60% in most the frequency range from 3 GHz to 5 GHz (5G RATs), and above 50% at the frequency ranges from 700 MHz-960 MHz, 1700 MHz-2100 MHz (2G, 3G and 4G RAT bands).

As well, the 8×8 MIMO antenna array also has a good impedance matching with the output impedance of the transceiver 152 of the electronic device 10 at the frequency ranges from 700 MHz-960 MHz, 1700 MHz-2100 MHz, and 3 GHz to 5 GHz. According to measured results illustrated in the example of FIG. 20, the 8×8 MIMO antenna array has scattering parameters $S_{Rx\text{-}Rx}$ equal or substantially less than −10 dB from 700 MHz-960 MHz, 1700 MHz-2100 MHz, and 3 GHz-5 GHz.

First Exemplary 10×10 MIMO Antenna Array—Antennas 200, 300, 400, 500, and 600

Figure 22:
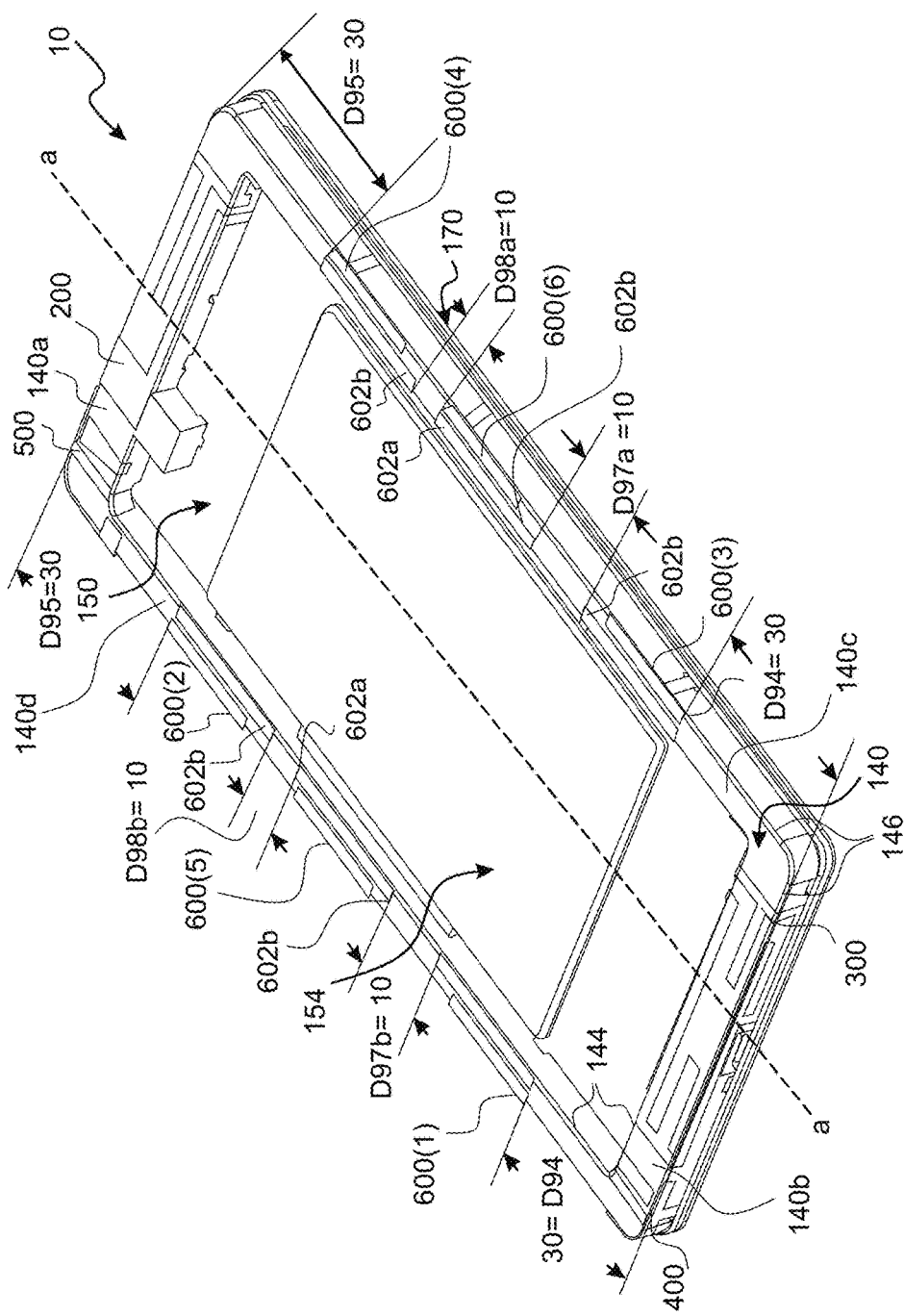
FIG. 22 is a back perspective view of an electronic device having an array of ten antennas, according to a second arrangement of example embodiments.

FIG. 22 illustrates a first exemplary 10×10 MIMO antenna array. The antenna array includes antennas 200, 300, 400, 500, and 600(1)-600(6), which are securely placed on the back surface 142 of the support member 140, for example by copper glue.

Antennas 200, 300, 400, 500, and 600(1)-600(4) in the example of FIG. 22 may be placed on the support member 140 at identical positions as and be arranged in substantially similar manners with antennas 200, 300, 400, 500, and 600(1)-600(4), respectively, of the exemplary 8×8 MIMO antenna array illustrated in FIG. 21.

In addition, the 10×10 MIMO antenna array in FIG. 22 includes two additional antennas 600(5) and 600(6) on the back surface 142 of the two side portions 140c and 140d. As shown in FIG. 22, antenna 600(5) is securely placed on the back surface of the side portion 140d of the support member 140 between antennas 600(1) and 600(2), and antenna 600(6) is securely placed on the back surface of the side portion 140c of the support member 140 between antennas 600(3) and 600(4). As illustrated in FIG. 22, the feeding pin 601 of each of the antennas 600(5)-600(6) is placed close to or on the inner surface 144 defined by corresponding side portions 140c and 140d of the support member 140. Shorting pin 606 of each of the antennas 600(5)-600(6) is placed close to or on the outer surface 146 defined by the corresponding side portions 140c and 140d of the support member 140

The distance between the end 602b of antenna 600(1) and the end 602b of antenna 600(5) is D97a, and the distance between the end 602b of antenna 600(3) and the end 602b of antenna 600(6) is D97b. In the example illustrated in FIG. 22, D97a=D97b=10 mm. The distance between the end 602a of antenna 600(5), which is aligned with the end 604a of antenna 600(5), and the end 602b of antenna 600(2) is D98a, and the distance between the end 602a of antenna 600(6), which is aligned with the end 604a of antenna 600(6), and the end 602b of antenna 600(4) is D98b. In the example illustrated in FIG. 22, D98a=D98b=10 mm. Similar to D91, D92, D93, D94, D95 and D96 illustrated in FIG. 21, D97a, D97b, D98a, and D98b may be also be varied as long as any coupling between any two antennas of 200, 300, 400, 500 and 600(1)-600(6) below a defined threshold level, for example, −12 dB.

In the example of FIG. 22, the aligned ends 602a and 604a of antennas 600(5) and 600(6) are pointed toward the top portion 140a of the support member 140 of the electronic device 10. In some examples, the aligned ends 602a and 604a of at least one of the antennas 600(5) and 600(6) are pointed toward the bottom portion 140b of the support member 140 of the electronic device 10.

Each of antennas 200, 300, 400, 500 and 600(1)-600(6) are electrically connected to the transceiver 152 on the PCB board 150. Battery 154 supplies power to PCB 150 and transceiver 152.

In some example embodiments, antennas 600(1), 600(2), and 600(5) are substantially symmetrical with antennas 600(3), 600(4), and 600(6) with respect to the longitudinal central axis a-a of the electronic device 10, as illustrate in the example of FIG. 22.

In the example of FIG. 22, the 10×10 MIMO antenna array supports frequency ranges from 700 MHz-960 MHz, 1700 MHz-2100 MHz, and 3 GHz-5 GHz, and therefore 2G-5G RATs, at the same time. Similarly, the electronic device 10 with the 10×10 MIMO antenna array illustrated in FIG. 22 only needs 10 antennas to support 2G, 3G, 4G and 5G RATs at the same time. As such, the 10×10 MIMO antenna array illustrated in FIG. 22 occupies less free space within the housing 158 and thus is more flexible to implement. Finally, as the arrangement of antennas 200, 300, 400, 500, and 600(1)-600(6) in FIG. 22 is based on the actual arrangement of the existing hardware and available free space in the housing 158 of electronic device 10, the 10×10 MIMO antenna array can be conveniently implemented in electronic device 10 without modifying the existing hardware arrangement of electronic device 10.

Second Exemplary 10×10 MIMO Antenna Array—Antennas 400, 500, and 600

Figure 23:
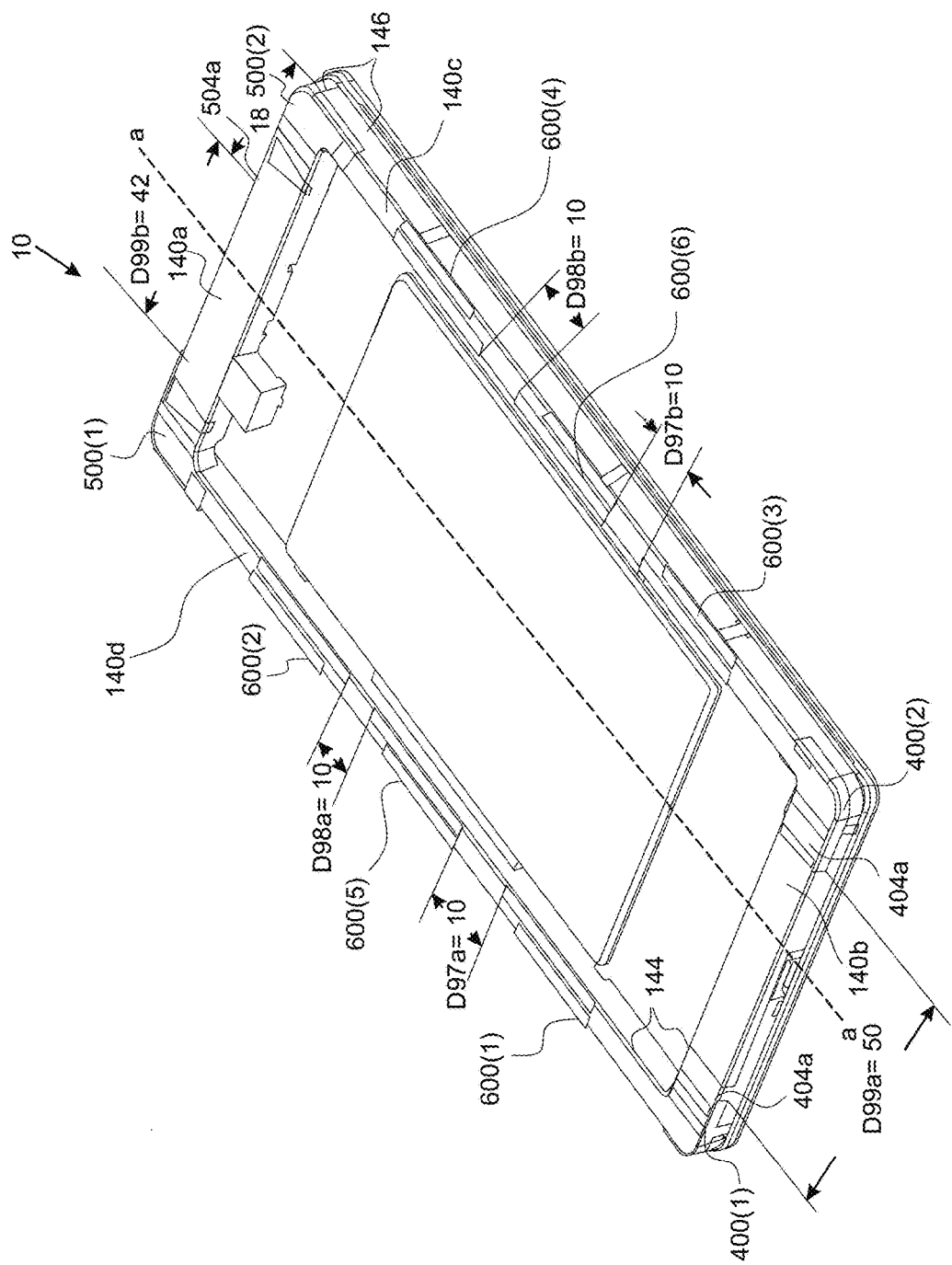
FIG. 23 is a back perspective view of an electronic device having an array of ten antennas, according to a third arrangement of example embodiments.

FIG. 23 illustrates a second exemplary 10×10 MIMO antenna array which includes antennas 400(1)-400(2), 500(1)-500(2), and 600(1)-600(6) supported in housing 158. Antennas 400(1)-400(2), 500(1)-500(2), and 600(1)-600(6) may be securely placed on the back surface 142 of the support member 140, for example, by copper glue.

Antennas 400 (1), 500 (1), and 600(1)-600(6) in FIG. 23 may be placed on the support member 140 at identical positions as and be arranged in substantially similar manners with antennas 400, 500, and 600(1)-600(6), respectively, of the first exemplary 10×10 MIMO antenna array illustrated in FIG. 22.

Unlike the first exemplary 10×10 MIMO antenna array, the second exemplary 10×10 MIMO antenna array illustrated in FIG. 23 does not include antennas 200 and 300, but includes two additional antennas 400(2) and 500(2).

As shown in FIG. 23, antenna 400(2) is placed on the back surface 142 of the bottom right corner defined by the bottom portion 140b and the side portion 140c of the support member 140. As illustrated in FIG. 23, the feeding pin 401 of antenna 400(2) is placed close to or on the inner surface 144 defined by the bottom portion 140b of the support member 140. Shorting pin 414 of antenna 400(2) is placed close to or on the outer surface 146 defined by the bottom portion 140b of the support member 140. The distance between the ends 404a of antennas 400(1) and 400(2) is D99a, for example, D99a=50 mm.

As well, antenna 500(2) is placed on the back surface 142 of the top right corner defined by the top portion 140a and the side portion 140c of the support member 140. The feeding pin 501 of antenna 500(2) is placed close to or on the inner surface 144 defined by the top portion 140a of the support member 140. Shorting pin 514 of antenna 500(2) is placed close to or on the outer surface 146 defined by the top portion 140a of the support member 140. The distance between the ends 504a of antennas 500(1) and 500(2) is D99b, for example, D99b=42 mm.

Each of the antennas 400(1)-400(2), 500(1)-500(2), and 600(1)-600(6) is electrically connected to the transceiver 152 on the PCB board 150 in the manner discussed previously. Battery 154 supplies power to PCB 150 and transceiver 152.

In some example embodiments, antennas 400(1), 500(1), 600(1), 600(2), and 600(5) are substantially symmetrical with antennas 400(2), 500(2), 600(3), 600(4), and 600(6), respectively, with respect to the longitude central axis a-a of the electronic device 10.

In the example of FIG. 23, antennas 400(1)-400(2), 500 (1)-500(2), and 600(1)-600(6) secured to the housing 158 are all have a frequency range of 3 GHz-5 GHz, antennas 400(1)-400(2) are substantially identical to each other, antennas 500(1)-500(2) are substantially identical to each other, and antennas 600(1)-600(6) are substantially identical to each other.

Accordingly, the second exemplary 10×10 MIMO antenna array illustrated in FIG. 23 supports frequency ranges from 3 GHz-5 GHz. As the arrangement of antennas 400(1)-400(2), 500(1)-500(2), and 600(1)-600(6) in FIG. 23 is based on the actual arrangement of the existing hardware and available free space in the housing 158 of electronic device 10, the second exemplary 10×10 MIMO antenna array can be conveniently implemented in electronic device 10 without modifying the existing hardware arrangement of electronic device 10.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

The invention claimed is:

1. An electronic device comprising:
a radio frequency (RF) communications circuit; and
a multiple input multiple output (MIMO) antenna array including a plurality of antennas connected to the RF communications circuit, wherein the plurality of antennas include a first antenna having a plurality of radiating members in a first physical configuration, a second antenna having a plurality of radiating members in a second physical configuration, a third antenna having a plurality of radiating members in a third physical configuration, a fourth antenna having a plurality of radiating members in a fourth physical configuration, and a plurality of fifth antennas each having a plurality of radiating members in a fifth physical configuration;
the first physical configuration of the first antenna and the second physical configuration of the second antenna being configured to simultaneously support operating frequency ranges of 700 MHz-900 MHz, 1700 MHz-2100 MHz, and 3 GHz-5 GHz;
the third physical configuration of the third antenna, the fourth physical configuration of the fourth antenna, and the fifth physical configuration of the fifth antennas being configured to support an operating frequency range of 3 GHz-5 GHz.

2. The electronic device of claim 1, wherein the physical configuration of each of the antennas is configured to provide a total efficiency of at least 60% in the operating frequency range of 3 GHz-5 GHz.

3. The electronic device of claim 2, wherein the first physical configuration of the first antenna and the second physical configuration of the second antenna are each configured to provide a total efficiency of at least 50% in the operating frequency ranges of 700 MHz-900 MHz and 1700 MHz-2100 MHz.

4. The electronic device of claim 1, wherein the first and second antennas are configured to support four different radio access technologies and the third, fourth and fifth antennas are each configured to support one, same, radio access technology.

5. The electronic device of claim 1, wherein the first and second antennas are configured to support each of second generation (2G), third generation (3G), fourth generation (4G) and fifth generation (5G) radio access technologies and the third, fourth and fifth antennas are each configured to support 5G radio access technology.

6. The electronic device of claim 1, wherein the electronic device includes a housing supporting the plurality of antennas.

7. The electronic device of claim 6, wherein the housing includes a rectangular perimeter sidewall having a top sidewall portion, a bottom sidewall portion, and two opposite sidewall portions each extending from the top sidewall portion to the bottom sidewall portion, wherein the first and second antennas are positioned at the top sidewall portion and the bottom sidewall portion respectively.

8. The electronic device of claim 7, wherein some of the plurality of fifth antennas are positioned at one of the opposite sidewall portions and a remainder of the plurality of fifth antennas are positioned at the other of the opposite sidewall portions.

9. The electronic device of claim 8, wherein the plurality of fifth antennas are positioned symmetrically with respect to both a longitudinal central axis of the housing and a latitudinal central axis of the housing.

10. The electronic device of claim 9, wherein the plurality of fifth antennas includes at least four fifth antennas.

11. The electronic device of claim 8, wherein the third and fourth antennas are positioned in respective diagonal corners of the housing.

12. The electronic device of claim 1, wherein each antenna includes a shorting pin electrically connected to a common ground, and each antenna includes a feeding pin electrically connected to the RF communications circuit for receiving RF signals or transmitting RF signals, the RF communications circuit being enabled to transmit and receive RF signals in any of the operating frequency ranges of 700 MHz-900 MHz, 1700 MHz-2100 MHz, and 3 GHz-5 GHz using the first and second antennas, and to transmit and receive RF signals in the operating frequency ranges of 3 GHz-5 GHz using the third, fourth and fifth antennas.

13. A multiple input multiple output (MIMO) antenna array comprising:
a plurality of antennas for transmitting radio frequency (RF) signals from a transmitter of an electronic device and for receiving external RF signals, wherein the plurality of antennas include a first antenna having a plurality of radiating members in a first physical configuration, a second antenna having a plurality of radiating members in a second physical configuration, a third antenna having a plurality of radiating members in a third physical configuration, a fourth antenna having a plurality of radiating members in a fourth physical configuration, and a plurality of fifth antennas each having a plurality of radiating members in a fifth physical configuration;
the first physical configuration of the first antenna and the second physical configuration of the second antenna being configured to simultaneously support operating frequency ranges of 700 MHz-900 MHz, 1700 MHz-2100 MHz, and 3 GHz-5 GHz;
the third physical configuration of the third antenna, the fourth physical configuration of the fourth antenna, and the fifth physical configuration of the fifth antennas being configured to support an operating frequency range of 3 GHz-5 GHz.

14. The MIMO antenna array of claim 13, wherein the physical configuration of each of the antennas is configured to provide a total efficiency of at least 60% in the operating frequency range of 3 GHz-5 GHz.

15. The MIMO antenna array of claim 14, wherein the first physical configuration of the first antenna and the second physical configuration of the second antenna are each configured to provide a total efficiency of at least 50% in the operating frequency ranges of 700 MHz-900 MHz and 1700 MHz-2100 MHz.

16. The MIMO antenna array of claim 13, wherein the first and second antennas are configured to support four different radio access technologies and the third, fourth and fifth antennas are each configured to support one, same, radio access technology.

17. The MIMO antenna array of claim 13, wherein the first and second antennas are configured to support each of second generation (2G), third generation (3G), fourth generation (4G) and fifth generation (5G) radio access technologies and the third, fourth and fifth antennas are each configured to support 5G radio access technology.

18. The MIMO antenna array of claim 13, wherein the electronic device includes a housing supporting the plurality of antennas.

19. The MIMO antenna array of claim 18, wherein the housing includes a rectangular perimeter sidewall having a top sidewall portion, a bottom sidewall portion, and two opposite sidewall portions each extending from the top sidewall portion to the bottom sidewall portion, wherein the first and second antennas are positioned at the top sidewall portion and the bottom sidewall portion respectively.

20. The MIMO antenna array of claim 19, wherein some of the plurality of fifth antennas are positioned at one of the opposite sidewall portions and a remainder of the plurality of fifth antennas are positioned at the other of the opposite sidewall portions.

21. The MIMO antenna array of claim 20, wherein the plurality of fifth antennas are positioned symmetrically with respect to both a longitudinal central axis of the housing and a latitudinal central axis of the housing.

22. The MIMO antenna array of claim 21, wherein the plurality of fifth antennas includes at least four fifth antennas.

23. The MIMO antenna array of claim 20, wherein the third and fourth antennas are positioned in respective diagonal corners of the housing.

24. The MIMO antenna array of claim 13, wherein each antenna includes a shorting pin electrically connected to a common ground, and each antenna includes a feeding pin electrically connected to an RF communication circuit for receiving RF signals or transmitting RF signals, the RF communication circuit being enabled to transmit and receive RF signals in any of the operating frequency ranges of 700 MHz-900 MHz, 1700 MHz-2100 MHz, and 3 GHz-5 GHz using the first and second antennas, and to transmit and receive RF signals in the operating frequency ranges of 3 GHz-5 GHz using the third, fourth and fifth antennas.

* * * * *